(12) United States Patent
Limberg

(10) Patent No.: US 8,411,761 B2
(45) Date of Patent: Apr. 2, 2013

(54) SUB-CHANNEL ACQUISITION IN A DIGITAL TELEVISION RECEIVER DESIGNED TO RECEIVE MOBILE/HANDHELD SIGNALS

(75) Inventor: Allen LeRoy Limberg, Port Charlotte, FL (US)

(73) Assignee: Samsung Electronics Co., Ltd., Suwon-si (KR)

( * ) Notice: Subject to any disclaimer, the term of this patent is extended or adjusted under 35 U.S.C. 154(b) by 616 days.

(21) Appl. No.: 12/555,248

(22) Filed: Sep. 8, 2009

(65) Prior Publication Data

US 2010/0061465 A1 Mar. 11, 2010

Related U.S. Application Data

(60) Provisional application No. 61/191,323, filed on Sep. 8, 2008, provisional application No. 61/194,599, filed on Sep. 29, 2008, provisional application No. 61/203,584, filed on Dec. 22, 2008, provisional application No. 61/201,539, filed on Dec. 11, 2008, provisional application No. 61/208,725, filed on Feb. 26, 2009, provisional application No. 61/215,764, filed on May 9, 2009.

(51) Int. Cl.
*H03D 3/24* (2006.01)
(52) U.S. Cl. ........... 375/240.27; 375/270; 348/724; 348/726; 348/731; 714/792; 714/763
(58) Field of Classification Search .......... None
See application file for complete search history.

(56) References Cited

U.S. PATENT DOCUMENTS

| 2007/0121681 A1* | 5/2007 | Kang et al. ............ 370/535 |
| 2007/0230460 A1* | 10/2007 | Jeong et al. ............ 370/389 |
| 2008/0008175 A1 | 1/2008 | Park |
| 2008/0214102 A1 | 9/2008 | Kallio et al. |

OTHER PUBLICATIONS

International Searching Authority's Search Report dated Oct. 15, 2009.

* cited by examiner

*Primary Examiner* — Ayaz Sheikh
*Assistant Examiner* — Nicholas Sloms
(74) *Attorney, Agent, or Firm* — Sughrue Mion, PLLC

(57) ABSTRACT

When a change in sub-channel selection is made after a mobile/handheld (M/H) Frame is begun, an M/H receiver is for some time unable to correct byte errors by transverse Reed-Solomon (TRS) decoding of turbo decoding results. Despite this, later stages of the M/H receiver are supplied data that cyclic-redundancy-check (CRC) decoding of Internet protocol (IP) packets does not find to be in error. Some of the IP packets comprise Service Map Table (SMT)-mobile/handheld (MH) data used to update SMT determining how the M/H receiver is operated. SMT-MH data that have not been subjected to TRS byte-error correction are kept from updating the SMT until those SMT-MH data are verified by later SMT-MH data subjected to TRS byte-error correction. Transmitting total number of Groups (TNOG) information for the currently received M/H Frame in all its sub-frames speeds up acquisition of Fast Information Channel updates by the M/H receiver.

10 Claims, 17 Drawing Sheets

| SYNTAX | BITS | FORMAT |
|---|---|---|
| TPC_data in initial 2 M/H sub-Frames { | | |
|   sub-Frame_number | 1 - 3 | uimsbf |
|   Slot_number | 4 - 7 | uimsbf |
|   Parade_id | 8 - 14 | uimsbf |
|   current_starting_Group_number | 15 - 18 | uimsbf |
|   current_number_of_Groups_minus_1 | 19 - 21 | uimsbf |
|   Parade_Repetition_Cycle_minus_1 | 22 - 24 | uimsbf |
|   current_RS_frame_mode | 25 - 26 | bslbf |
|   current_RS_code_mode_primary | 27 - 28 | bslbf |
|   current_RS_code_mode_secondary | 29 - 30 | bslbf |
|   current_SCCC_block_mode | | |
|   current_SCCC_outer_code_mode_a | 33 - 34 | bslbf |
|   current_SCCC_outer_code_mode_b | 35 - 36 | bslbf |
|   current_SCCC_outer_code_mode_c | 37 - 38 | bslbf |
|   current_SCCC_outer_code_mode_d | 39 - 40 | bslbf |
|   FIC_version | 41 - 45 | uimsbf |
|   Parade_continuity_counter | 46 - 49 | uimsbf |
|   current_total_number_of_Groups | 50 - 54 | uimsbf |
|   reserved | 55 - 59 | |
|   reserved | 60 - 75 | |
|   TPC_protocol_version_major_update | 76 - 77 | bslbf |
|   TPC_protocol_version_minor_update | 78 - 80 | bslbf |
| } | | |

Fig. 4A    Bit Syntax of TPC in M/H Sub-Frames #0 & #1

| SYNTAX | BITS | FORMAT |
|---|---|---|
| TPC_data in final 3 M/H sub-Frames { | | |
|   sub-Frame_number | 1 - 3 | uimsbf |
|   Slot_number | 4 - 7 | uimsbf |
|   Parade_id | 8 - 14 | uimsbf |
|   next_starting_Group_number | 15 - 18 | uimsbf |
|   next_number_of_Groups_minus_1 | 19 - 21 | uimsbf |
|   Parade_Repetition_Cycle_minus_1 | 22 - 24 | uimsbf |
|   next_RS_frame_mode | 25 - 26 | bslbf |
|   next_RS_code_mode_primary | 27 - 28 | bslbf |
|   next_RS_code_mode_secondary | 29 - 30 | bslbf |
|   next_SCCC_block_mode | 31 - 32 | bslbf |
|   next_SCCC_outer_code_mode_a | 33 - 34 | bslbf |
|   next_SCCC_outer_code_mode_b | 35 - 36 | bslbf |
|   next_SCCC_outer_code_mode_c | 37 - 38 | bslbf |
|   next_SCCC_outer_code_mode_d | 39 - 40 | bslbf |
|   FIC_version | 41 - 45 | uimsbf |
|   Parade_continuity_counter | 46 - 49 | uimsbf |
|   next_total_number_of_Groups | 50 - 54 | uimsbf |
|   current_total_number_of_Groups | 55 - 59 | uimsbf |
|   reserved | 60 - 75 | |
|   TPC_protocol_version_major_update | 76 - 77 | bslbf |
|   TPC_protocol_version_minor_update | 78 - 80 | bslbf |
| } | | |

Fig. 4B  Bit Syntax of TPC in M/H Sub-Frames #2, #3 & #4

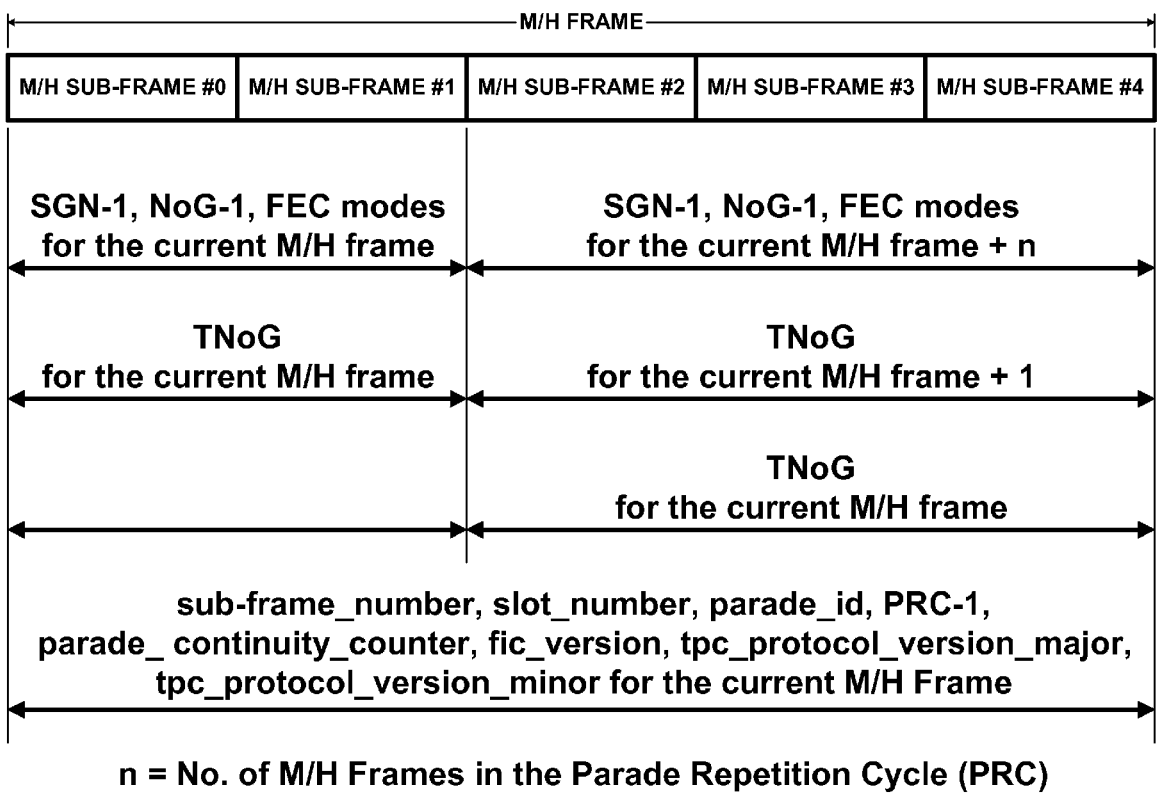
Fig. 5 Signaling in advance

SUB-CHANNEL ACQUISITION IN A DIGITAL TELEVISION RECEIVER DESIGNED TO RECEIVE MOBILE/HANDHELD SIGNALS

CROSS-REFERENCE TO RELATED APPLICATIONS

This application claims priority from U.S. Provisional Application Ser. Nos. 61/191,323, 61/194,599, 61/201,539, 61/203,584, 61/208,725 and 61/215,764 filed on Sep. 8, 2008, Sep. 29, 2008, Dec. 11, 2008, Dec. 22, 2008, Feb. 26, 2009 and May 9, 2009, respectively, the disclosures of which are incorporated in their entirety herein by reference.

BACKGROUND OF THE INVENTION

1. Field

The apparatuses and methods consistent with the present inventive concept relate to the transmission and reception of digital television (DTV) signals in over-the-air broadcasting, which DTV signals include robustly coded data and accompanying signaling designed for reception by mobile/handheld (M/H) receivers.

2. Related Art

The Advanced Television Systems Committee (ATSC) published its ATSC Digital Television Standard in 1995 as Document A/53, hereinafter referred to simply as "A/53" for sake of brevity. The Annex D of A/53 titled "RF/Transmission Systems Characteristics" is particularly incorporated by reference into this specification. A/53 describes vestigial-sideband (VSB) amplitude modulation of the radio-frequency (RF) carrier wave using an eight-level modulating signal, which type of over-the-air DTV broadcasting is called "8-VSB". In the beginning years of the twenty-first century, efforts have been made by some in the DTV industry to provide for more robust transmission of data over broadcast DTV channels without unduly disrupting operations of so-called "legacy" DTV receivers already in the field. Robust transmission of data for reception by M/H receivers will be provided for in successive versions of an ATSC standard for DTV broadcasting to M/H receivers referred to more briefly as the M/H standard. An initial version is an ATSC Mobile DTV Standard referred to as "A/153" for sake of brevity. A/153 has been published by ATSC as a candidate standard.

The operation of nearly all legacy DTV receivers is disrupted if 2/3 trellis coding is not preserved throughout every transmitted data field. Also, the average modulus of the DTV signal should be the same as for an 8-VSB signal as specified in the 1995 version of A/53, so as not to disrupt adaptive equalization in legacy receivers using the constant modulus algorithm (CMA).

Another problem concerning "legacy" DTV receivers is that a large number of such receivers were sold that were designed not to respond to broadcast DTV signals unless de-interleaved data fields recovered by trellis decoding were preponderantly filled with (207, 187) Reed-Solomon (RS) forward-error-correction (FEC) codewords of a specific type or correctable approximations to such codewords. Accordingly, in order to accommodate continuing DTV signal reception by such legacy receivers, robust transmissions are constrained in the following way. Before convolutional byte interleaving, data fields should be preponderantly filled with (207, 187) RS FEC codewords of the type specified in A/53.

This constraint has led to M/H data encoded for reception by M/H receivers being encapsulated within (207, 187) RS FEC codewords of type similar to that specified in A/53. The (207, 187) RS FEC codewords differ somewhat, however, in that they are not necessarily systematic with the twenty parity bytes located at the conclusions of the codewords. The twenty parity bytes of some of these (207, 187) RS FEC codewords appear earlier in the codewords to accommodate inclusion of training signals in the fields of interleaved data. The 207-byte RS FEC codewords invariably begin with a three-byte header similar to the second through fourth bytes of an MPEG-2 packet, with a thirteen-bit packet-identification (PID) code in the fourth through sixteenth bit positions. (MPEG-2 packets and MPEG-4 packets are two types of data transport packets specified by the Moving Picture Experts Group.) Except for the three-byte header and the twenty parity bytes in each (207, 187) RS FEC codeword, the remainder of the codeword has been considered to be available for "encapsulating" 184 bytes of a robust transmission. (In actuality, the inventor notes, the last byte of the three-byte header of the 207-byte RS FEC codeword can also be replaced by a byte of M/H data, so a 207-byte RS FEC codeword could "encapsulate" 185 bytes of a robust transmission.)

A/153 specifies that successive equal lengths of M/H data streams are subjected to transverse RS (TRS) coding, and then, to periodic cyclic redundancy check (CRC) coding to develop indications of possible locations of byte errors in the TRS coding. These procedures are designed to correct byte errors caused by protracted burst noise, particularly as may arise from loss of received signal strength, and are performed in an apparatus called an "M/H Frame encoder". An M/H Frame is a time interval that, at least usually, is of the same 968-millisecond duration as twenty 8-VSB frame intervals. The M/H Frame is sub-divided into five equal-length M/H sub-frames, each composed of 16 successive Groups of M/H data, thereby defining 80 Slots for M/H data in each M/H Frame. The related M/H data within a selected set of the 80 Slots in an M/H Frame is referred to as a "Parade". Each Parade is composed of one "Ensemble" or of two Ensembles located in different portions of Groups. Each Ensemble is TRS and CRC coded independently of every other Ensemble.

The output signal from the M/H Frame encoder is supplied for subsequent serial concatenated convolutional coding (SCCC) of the general sort described by Valter Benedetto in U.S. Pat. No. 5,825,832 issued Oct. 20, 1998 and titled "Method and Device for the Reception of Symbols Affected by Inter-symbol Interface". An encoder for the SCCC comprises an outer convolutional encoder, an interleaver for two-bit symbols generated by the outer convolutional encoder, and an inner convolutional encoder constituting the precoder and 2/3 trellis coder prescribed by A/53.

A/153 specifies that parity bytes generated by the TRS coding shall be transmitted at the conclusion of each of successive equal lengths of 187-byte M/H data streams used for generating them. TRS coding of M/H data frames extends over 968-millisecond intervals of 8-VSB signals. Three options are specified for the TRS coding. M/H transmissions shall use (211, 187), (223, 187) or (235, 187) TRS coding.

An initial portion of the TRS encoding procedure in the M/H Frame encoder can be analogized to a matrix-type block interleaving procedure of the following sort. A first RS framestore of the M/H Frame encoder is written row by row with respective successive equal lengths of M/H data stream, and then, read column by column to the RS coder, which generates successive TRS codewords. A final portion of the TRS coding procedure in the M/H Frame encoder can be analogized to a matrix-type block de-interleaving procedure of the following sort. A second RS framestore of the M/H Frame encoder is written column by column and row by row with respective to successive TRS codewords, and then, read row by row to reproduce respective successive equal lengths of the M/H data streams, each being followed by TRS parity bytes.

In an M/H receiver for M/H signals, turbo decoding of an SCCC'd M/H signal is followed by a TRS decoding and error-correction procedure. An initial portion of the TRS decoding procedure in an M/H Frame decoder can be analogized to a matrix-type block interleaving procedure of the following sort. A first RS framestore of the M/H receiver is written row by row with respective successive equal lengths of M/H data streams, each with TRS parity bytes, and then, read column by column to the RS decoder, which generates successive corrected TRS codewords. A final portion of the TRS decoding procedure in the M/H Frame decoder can be analogized to a matrix-type block de-interleaving procedure of the following sort. A second RS framestore is written column by column and row by row with respective corrected TRS codewords, and then, read row by row to reproduce respective successive equal lengths of error-corrected M/H data streams. The second RS framestore of the M/H receiver can be smaller than the first RS framestore since only data bytes of the corrected TRS codewords need to be subjected to the block de-interleaving procedure.

It takes 968 milliseconds for an RS framestore in the M/H receiver for M/H signals to be fully written, so TRS decoding and error-correction can begin. It then takes some time for the TRS decoding and error-correction to proceed and for subsequent block de-interleaving to be done. After this, block de-interleaved corrected M/H data can be written into a first-in/first-out (FIFO) cache memory that supports operations of subsequent stages of the receiver. Some time is necessary for the FIFO cache memory to fill sufficiently that there is little chance for the subsequent stages of the M/H receiver to be starved for bits required for their operation. The foregoing procedures introduce a delay of two seconds from the time a baseband M/H signal is received to be available for the M/H signal, as corrected by TRS decoding procedures, to be available for processing by later stages of the M/H receiver using a real-time transport protocol (RTP). This delay affects the time taken to change sub-channel selection if all available sub-channels are not being concurrently processed, presuming that an RF channel change is not required. If an RF channel change is required there will be further time required for re-tuning and stabilization of a front-end of the M/H receiver that heterodynes the M/H signal transmissions to the baseband and equalizes a channel response, which further time is typically only a fraction of a second.

The time for change in sub-channel selection set forth in the previous paragraph presumes that the change is made just previously to the beginning of an M/H Frame. If the M/H Frame has already begun when the change in sub-channel selection is made, there will be a wait until a next M/H Frame begins. That is, supposedly, only data the TRS decoding procedures find to be correct will be passed on to later stages of the M/H receiver. A/153, the candidate standard published in 2009, was based on a document submitted to the ATSC by LG Electronics Co., Ltd. on Oct. 15, 2007, which document is titled "MPH Physical Layer Technical Disclosure". The LG Electronics' M/H transmission system as originally proposed is designed to transmit an MPEG-2-compatible stream of 187-byte transport packets. However, it was decided by an ad hoc group within ATSC to transmit indeterminate-length Internet-Protocol (IP) Transport Stream (TS) packets instead. The indeterminate-length IP packets cannot be parsed by simply referring to the beginnings of rows of bytes in a TRS frame. Accordingly, A/153 prescribes that each of the rows of bytes in TRS frames begin with a 16-bit, two-byte header that includes an indication of where in the row an IP packet begins, if an IP packet begins in that row and is the first IP packet to begin in that row. If more than one IP packet begins in a row, the beginning of each further IP packet is reckoned from packet length information contained in a header of a preceding IP packet. The header of each IP packet contains a 16-bit, two-byte checksum for CRC coding of that particular IP packet.

An IP signal supplied to later stages of an M/H receiver includes Service Map Table-mobile/handheld (SMT-MH) packets transmitting a respective SMT for each Ensemble included in M/H signal transmission. These SMT-MH packets are used for assembling an Electronic Service Guide (ESG) that is made available on a view screen for guiding a user of the M/H receiver in the user's selection of a sub-channel to be received and a mode of reception of that sub-channel. After such selection by the user, stored SMT-MH data is used for conditioning an operation of the M/H receiver accordingly. Each SMT-MH packet includes indications therewithin as to whether the SMT-MH packet repeats a previous SMT-MH packet for the Ensemble or updates the previous SMT-MH packet. The repetition of SMT-MH packets is designed to make available an additional degree of protection of SMT-MH data against corruption by noise.

SUMMARY

One of the inventor's insights was that there is an inherent difference between the two sorts of SMT-MH packet. A first SMT-MH packet that updates instructions concerning processing of IP packets provides instructions solely concerning IP packets that succeed the first SMT-MH packet. A second SMT-MH packet that repeats instructions concerning processing of IP packets provides instructions that are applicable not only to IP packets that succeed the second SMT-MH packet, but also to IP packets that precede the second SMT-MH packet. The inventor discerned that characteristics of the second SMT-MH packet that repeats instructions concerning processing of IP packets might be valuable when resuming operation after reception of M/H signals at an M/H receiver has been interrupted.

An M/H receiver design issue concerns what to do with IP packets that are received after a change in sub-channel selection, but before SMT-MH data has been updated. SMT-MH data is sometimes available from a source of such data for a number of sub-channels, and indeed possibly for sub-channels of a number of channels of different radio frequencies. Another tactic is to use SMT-MH data stored at a previous time when the same sub-channel was selected. However, there are circumstances where an M/H receiver has no valid foreknowledge of the SMT-MH data, and such reception conditions are of general concern in regard to inventive concept claimed herein. Reception conditions of a particular concern are those in which an update of SMT-MH data is received after a change in sub-channel selection, but during an RS frame that is not complete. A possible tactic is to use that SMT-MH data if CRC decoding of IP packets containing the SMT-MH data do not indicate presence of error. Some experts within the ATSC have objected to supplying to later stages of an M/H receiver data not found by the CRC decoding to be in error when sub-channel selection is made too late to permit TRS byte-error correction to proceed immediately or nearly so. Their stated concern is that SMT-MH data corrupted in a way that the CRC decoding fails to detect may cause some sort of lock-out condition in the M/H receiver.

An aspect of the inventive concept claimed herewith is that any such condition can be avoided by a simple expedient of preventing SMT-MH data that has not been subjected to TRS byte-error correction from updating the SMT as it controls receiver operation, at least until that SMT-MH data can be verified by later SMT-MH data that has been subjected to TRS byte-error correction. However, other IP data that the CRC decoder does not find to be in error can still be used to help fill the FIFO cache memory. This may help reduce a chance for the later stages of the M/H receiver to be starved for IP packets required for their operation. When SMT-MH packets that have been subjected to TRS byte-error correction become available, each of these SMT-MH packets can be analyzed to determine whether it is an update or a repeat.

If a later SMT-MH packet contains an indication that it is an update, a decision can be made as to whether or not unprocessed previous contents of the FIFO cache memory for IP data should be used together with SMT-MH data from an earlier SMT-MH packet. This decision can be predicated on the likelihood of corruption of the earlier SMT-MH packet(s) by noise, or can be Draconian with the previous data including the earlier SMT-MH packet(s) being left unprocessed and after a time being discarded if it continues to remain unprocessed.

It is expected that usually the later SMT-MH packet contains an indication that it is a repeat and the later SMT-MH data from that packet confirms earlier SMT-MH data. In such case, the previous contents of the FIFO cache memory for IP data are used, and the SMT is updated.

However, it is possible that the later SMT-MH packet contains an indication that it is a repeat, but the later SMT-MH data is at variance with the earlier SMT-MH data. In designs using a FIFO cache memory capable of temporarily storing IP packets from a few M/H Frames, selection between the two sets of SMT-MH data can be resolved by reference to still later SMT-MH data. However, this entails additional delay in completing sub-channel selection. Suffering such additional delay will be more necessary if signal-to-noise ratio (SNR) of the received M/H signal is lower.

An aspect of the inventive concept claimed herewith is that a change is made in a Transmission Parameter Channel (TPC) signaling done by a DTV transmitter transmitting M/H data. The change provides for signaling of the total number of Groups for each sub-frame of a current M/H Frame being provided during final three sub-frames thereof as well as during initial two sub-frames thereof. This change may enable an M/H receiver receiving M/H signals to decode M/H data in a conclusion portion of an RS frame transmitted during a time when a change in sub-channel selection is made at the M/H receiver.

Another aspect of the inventive concept claimed herewith is that, if an M/H Frame has already begun when a change in sub-channel selection is made, so TRS byte-error correction cannot be performed, later stages of an M/H receiver receiving M/H signals are supplied data that CRC decoding of IP packets does not find to be in error. A further aspect of the inventive concept claimed herewith is that SMT-MH data that has not been subjected to TRS byte-error correction is kept from updating an SMT used to control operation of the M/H receiver. At least, this is so until that SMT-MH data is verified by later SMT-MH data that has been subjected to TRS byte-error correction.

Each of FIGS. 4A and 4B are tables showing a syntax of bits in the Transmission Parameter Channel (TPC) data, which syntax embodies an aspect of the inventive concept claimed herewith.

FIG. 5 illustrates advanced signaling of TPC data, according to an exemplary embodiment of the inventive concept claimed herewith.

Figure 1:
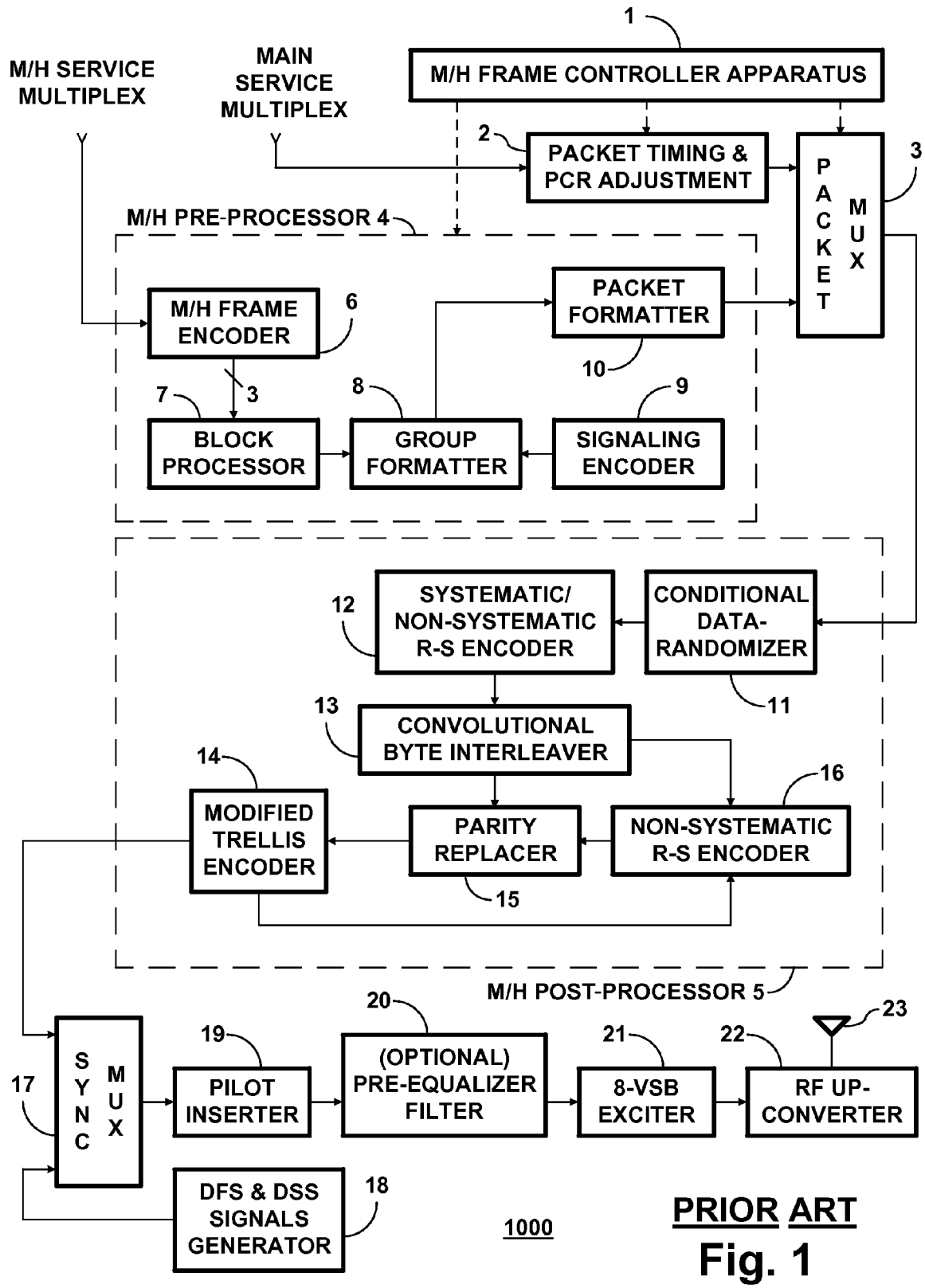
FIG. 1 is a schematic diagram of a related-art transmitter apparatus for broadcasting DTV signals to M/H receivers in accordance with the M/H standard.
Figure 6:
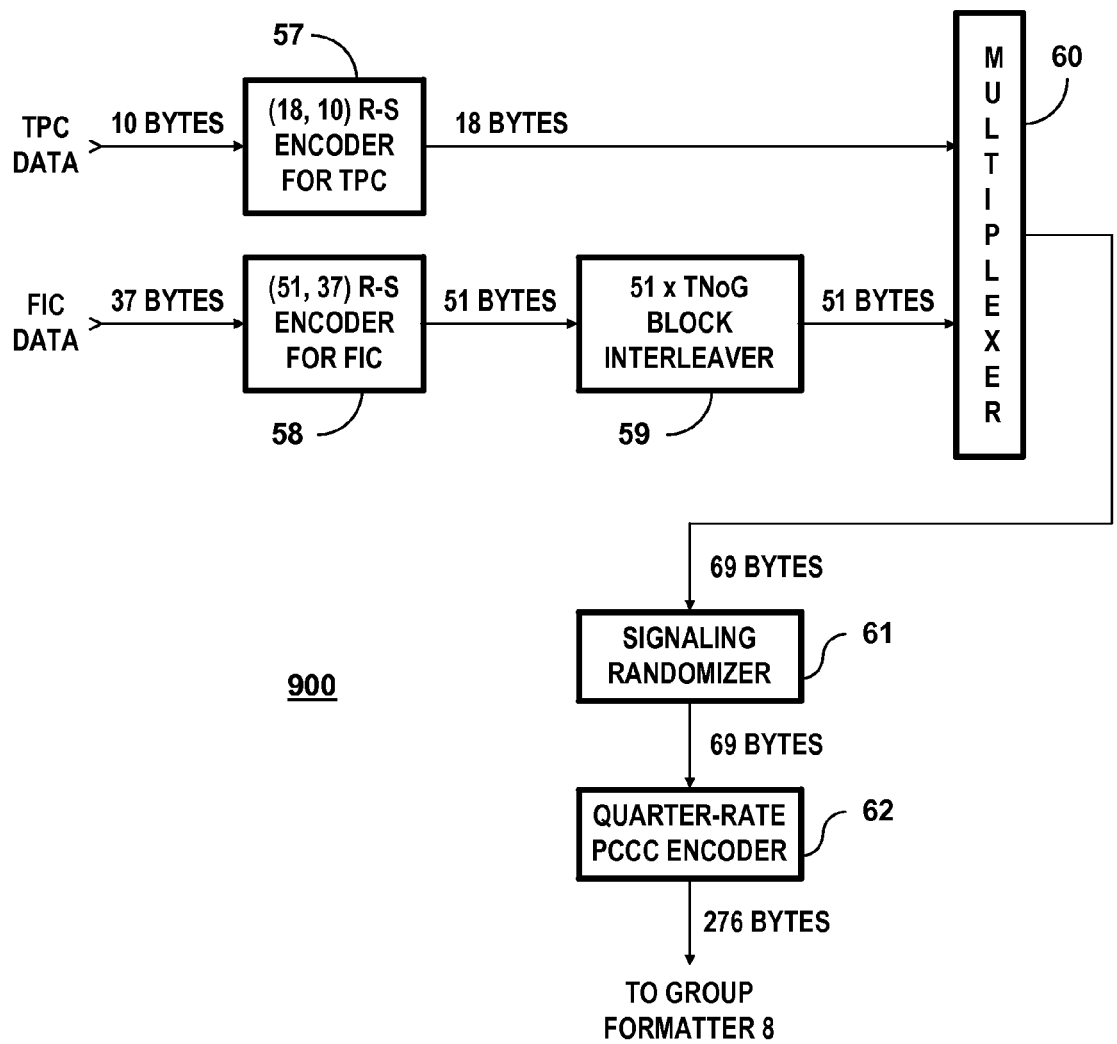

FIG. 6 is a schematic diagram of a signaling encoder 900 that can be used as the signaling encoder 9 in the FIG. 1 transmitter apparatus.

Figure 7A:
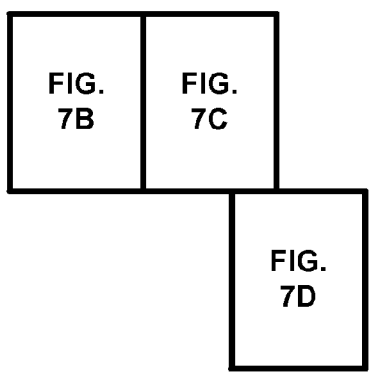
Figure 7B:
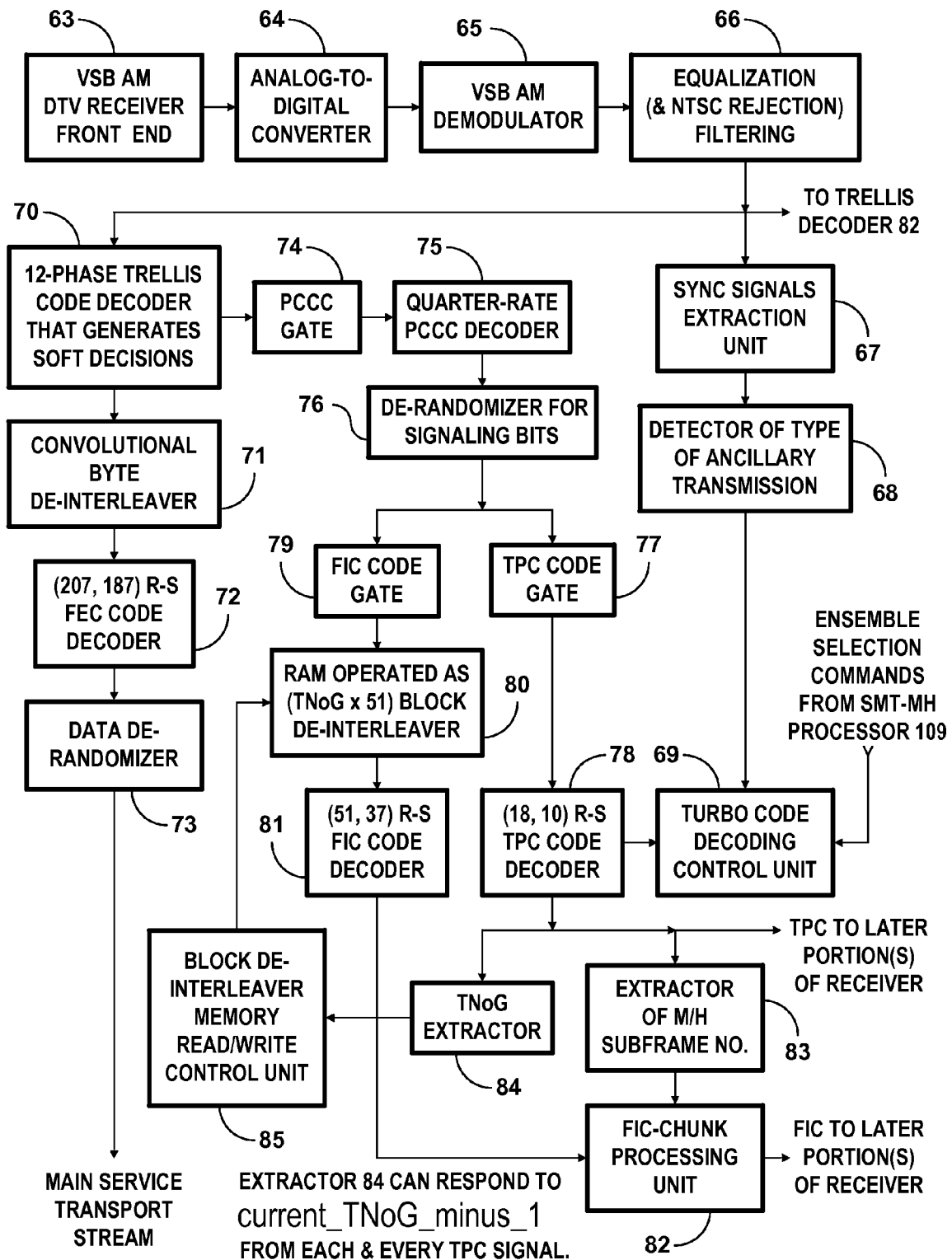
Figure 7C:
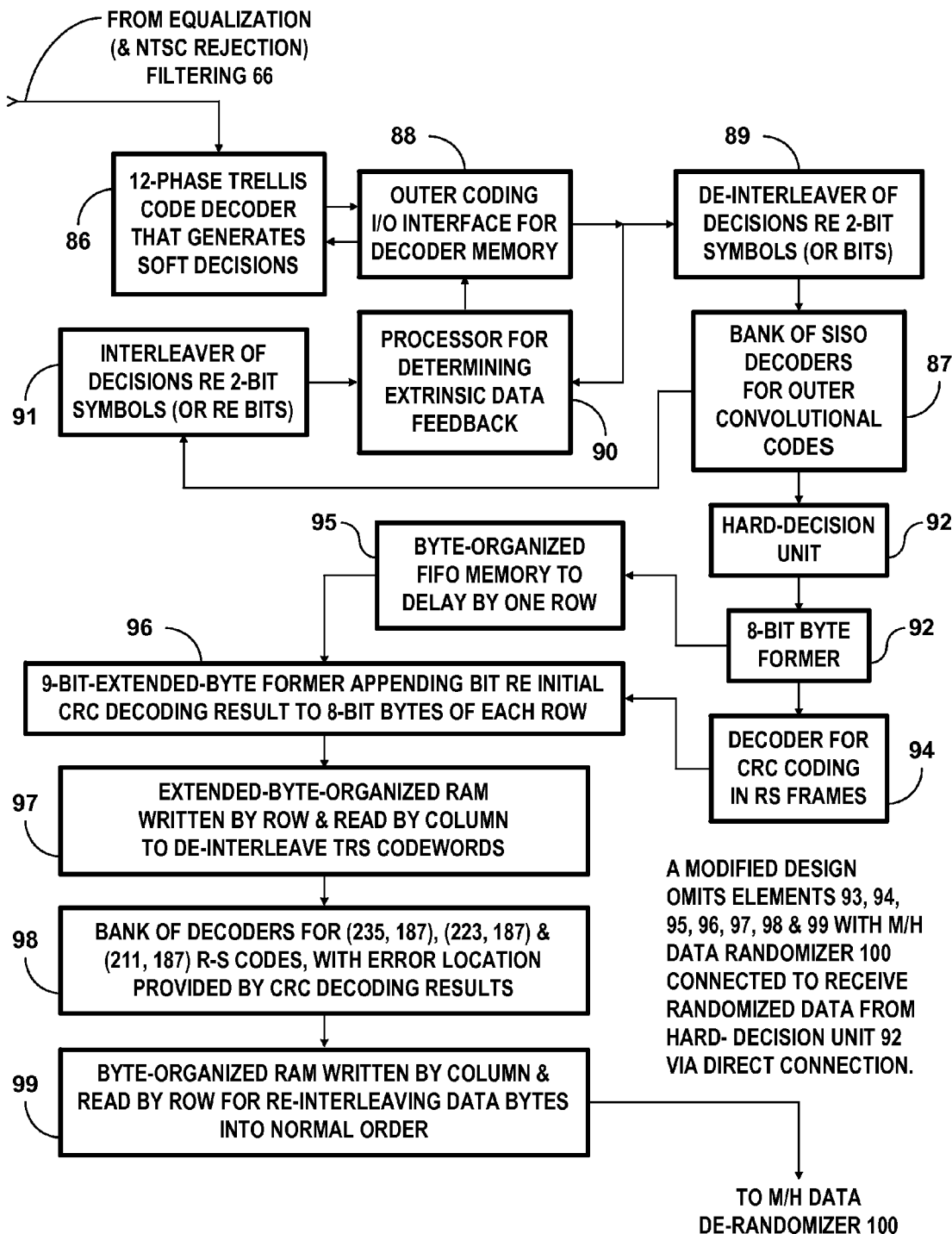
Figure 7D:
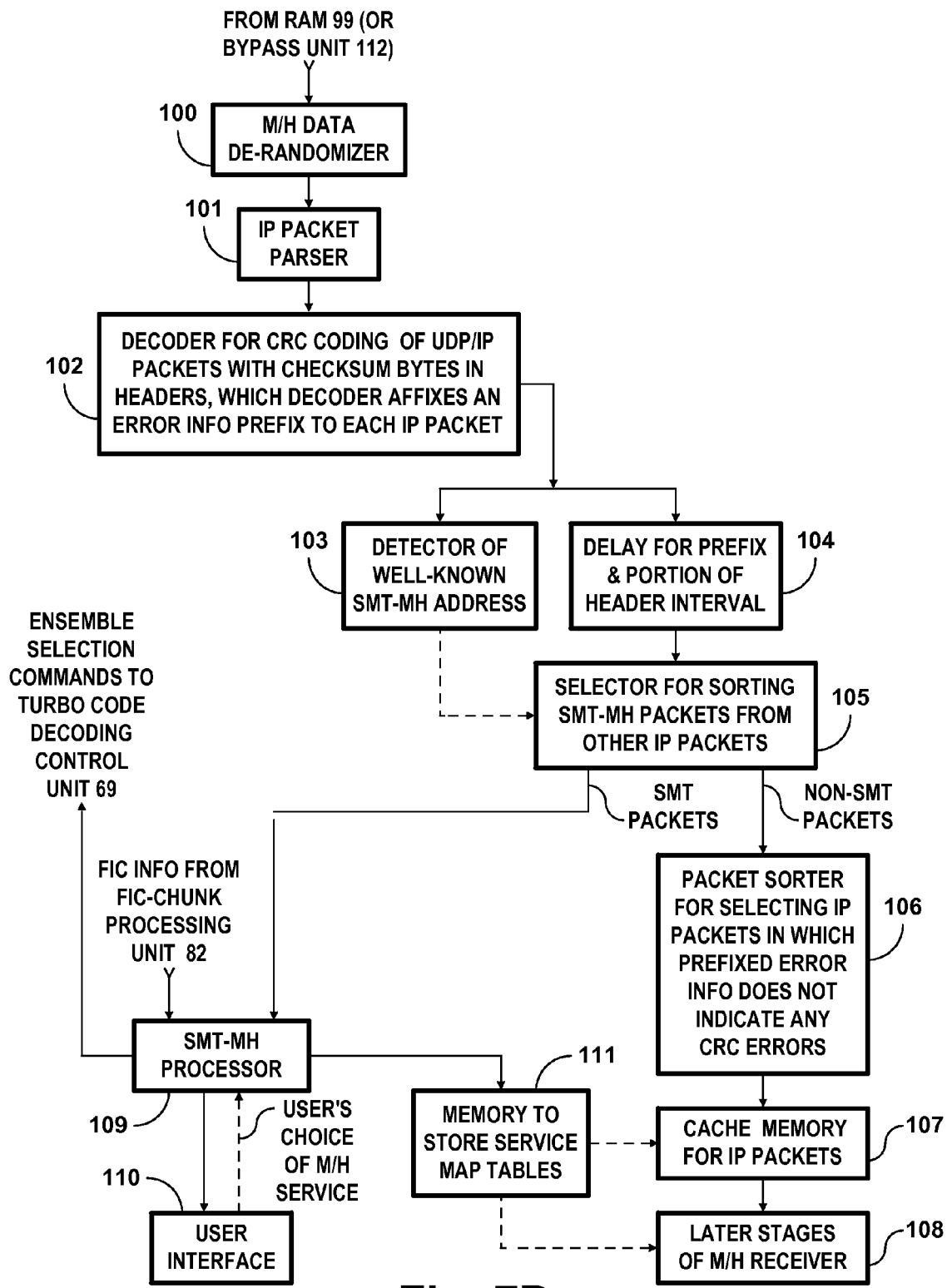

FIG. 7A is an assembly drawing that shows how FIGS. 7B, 7C and 7D are combined to provide a schematic diagram of an M/H receiver for receiving M/H transmissions sent over the air by the FIG. 1 transmitter apparatus.

Figure 8:
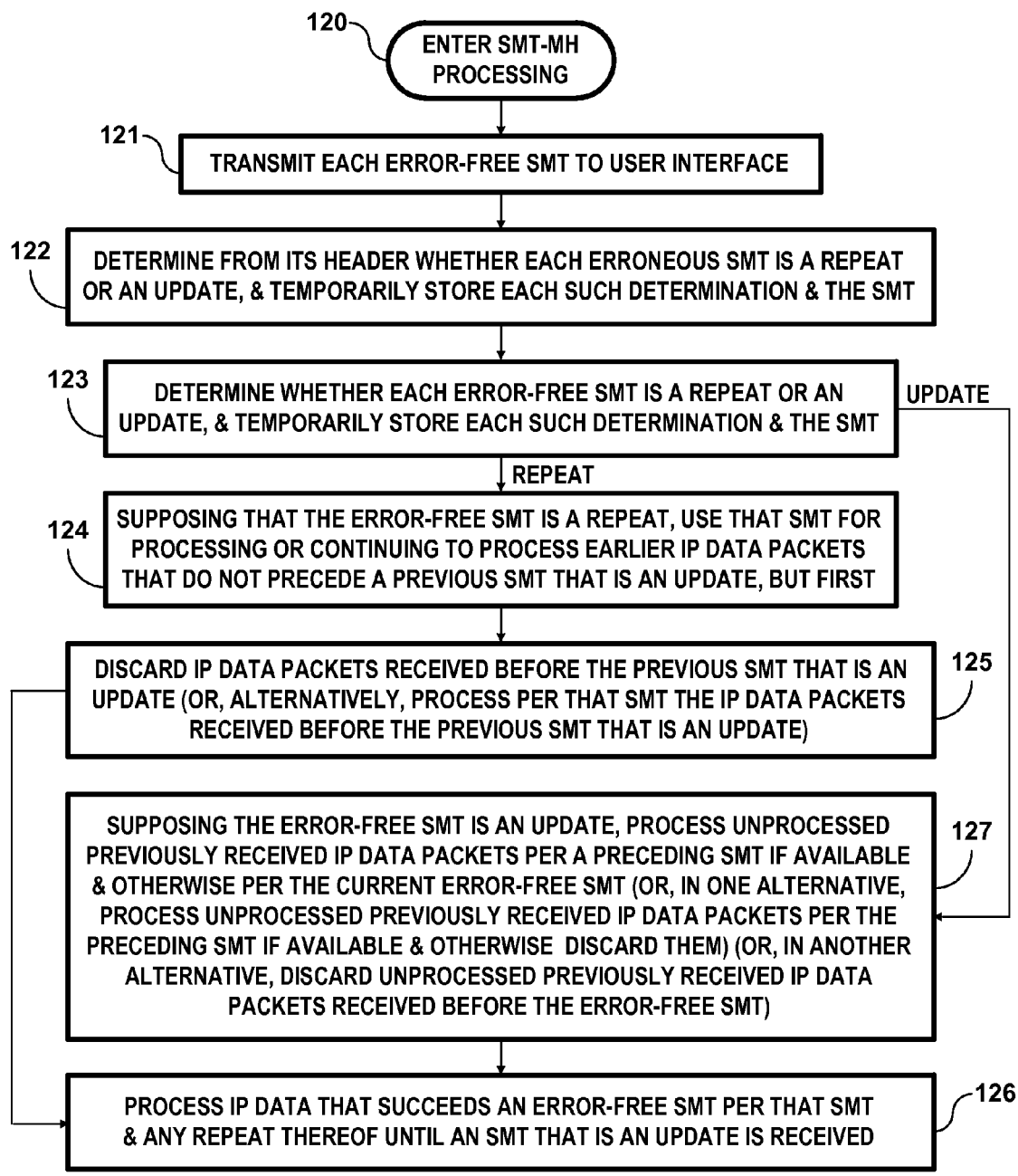

FIG. 8 is a flowchart illustrating operations of the SMT-MH processor 109 in the FIG. 7D portion of the FIG. 7A M/H receiver.

Figure 9:
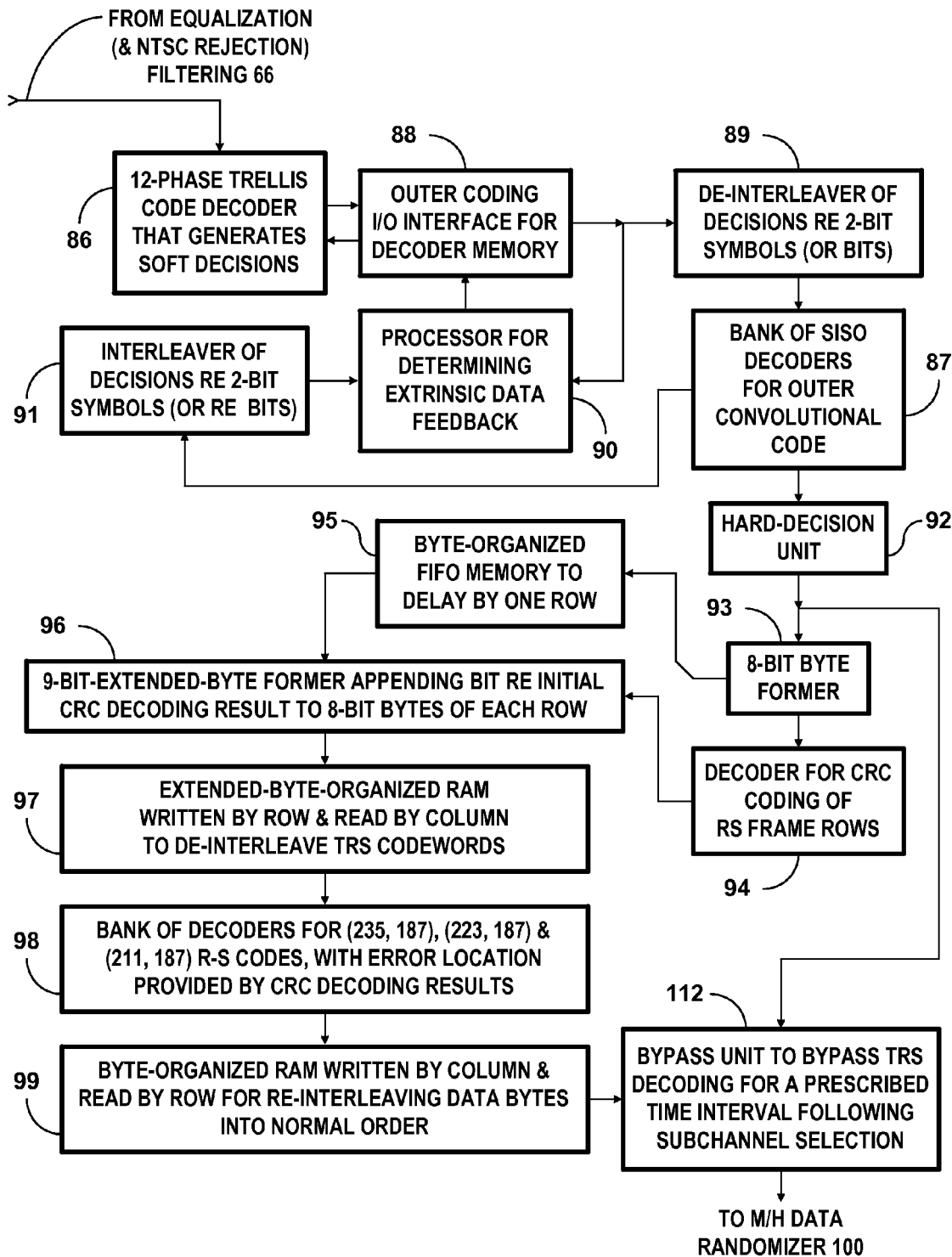

FIG. 9 is an alternative receiver portion that may replace the FIG. 7C portion of the FIG. 7A M/H receiver.

Figure 10:
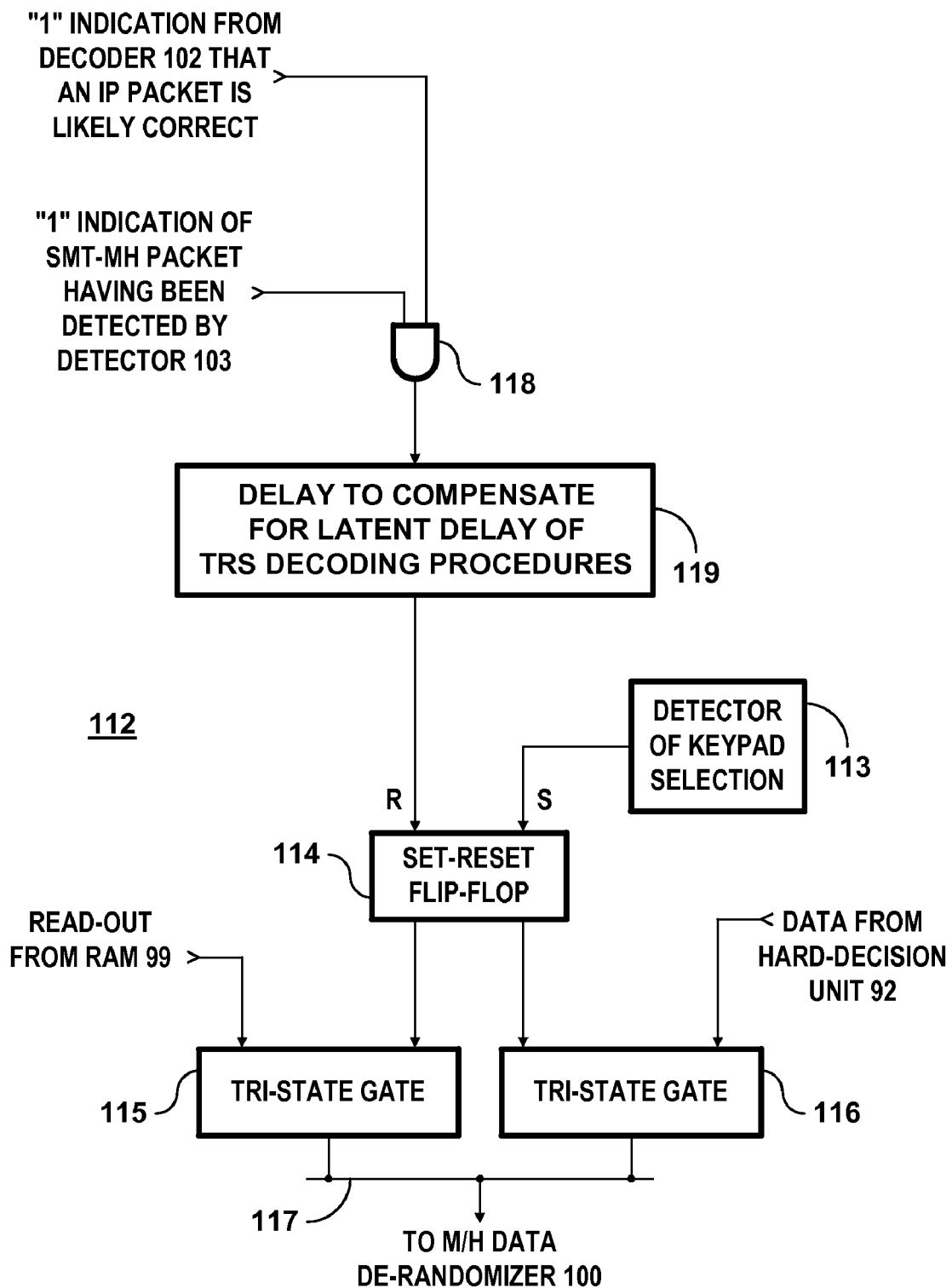

FIG. 10 illustrates a detailed schematic diagram of the bypass unit 112 shown in the FIG. 9 receiver portion, which bypass unit 112 is used to bypass TRS decoding for a time after a sub-channel is newly selected, according to an exemplary embodiment of an aspect of the inventive concept claimed herewith.

Figure 11:
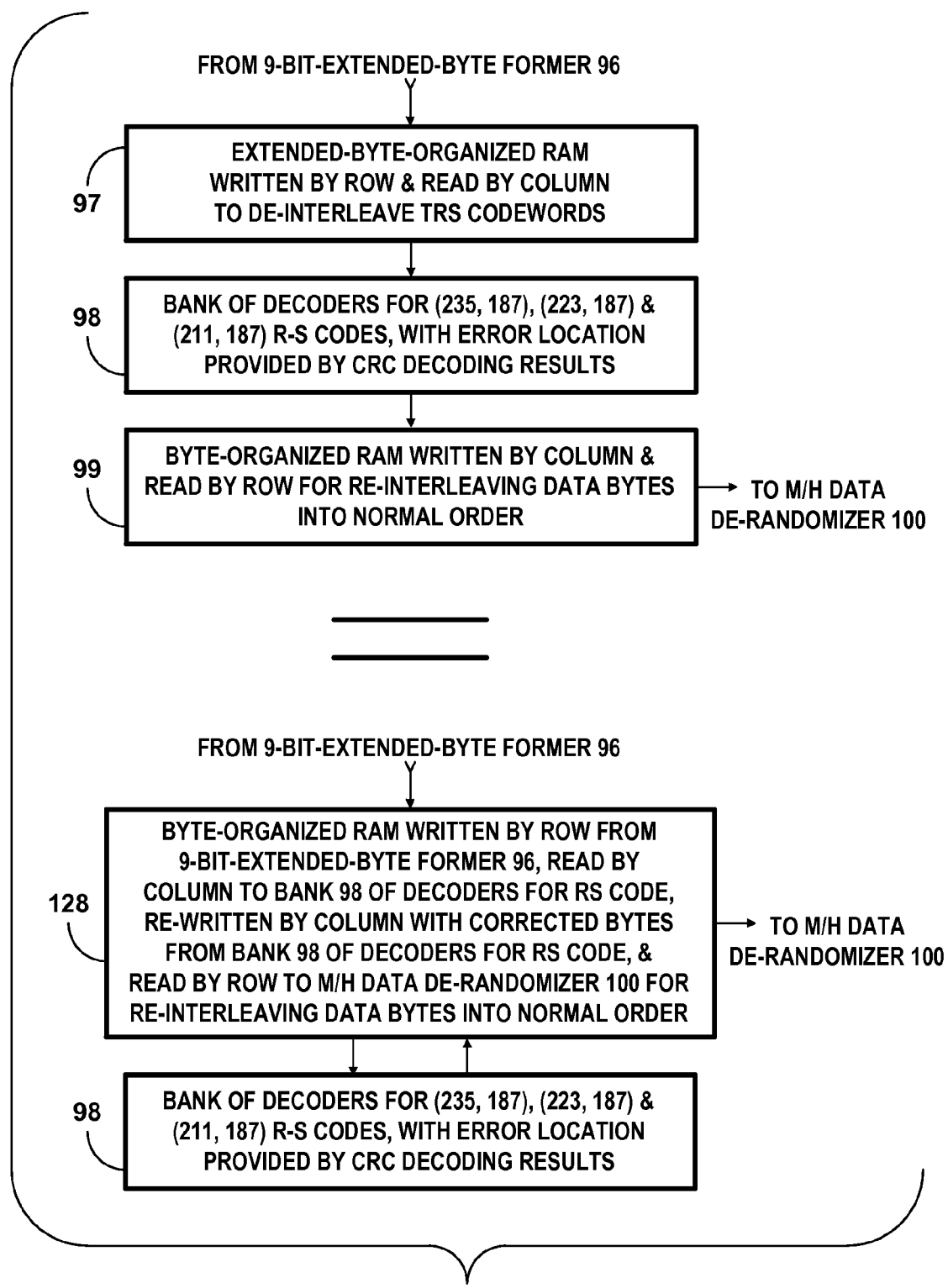

FIG. 11 is a schematic diagram illustrating how the RAM 97 and the RAM 99 shown both in FIG. 7C and in FIG. 9 can be replaced by a single RAM 128, according to an exemplary embodiment of an aspect of the present inventive concept.

Figure 12:
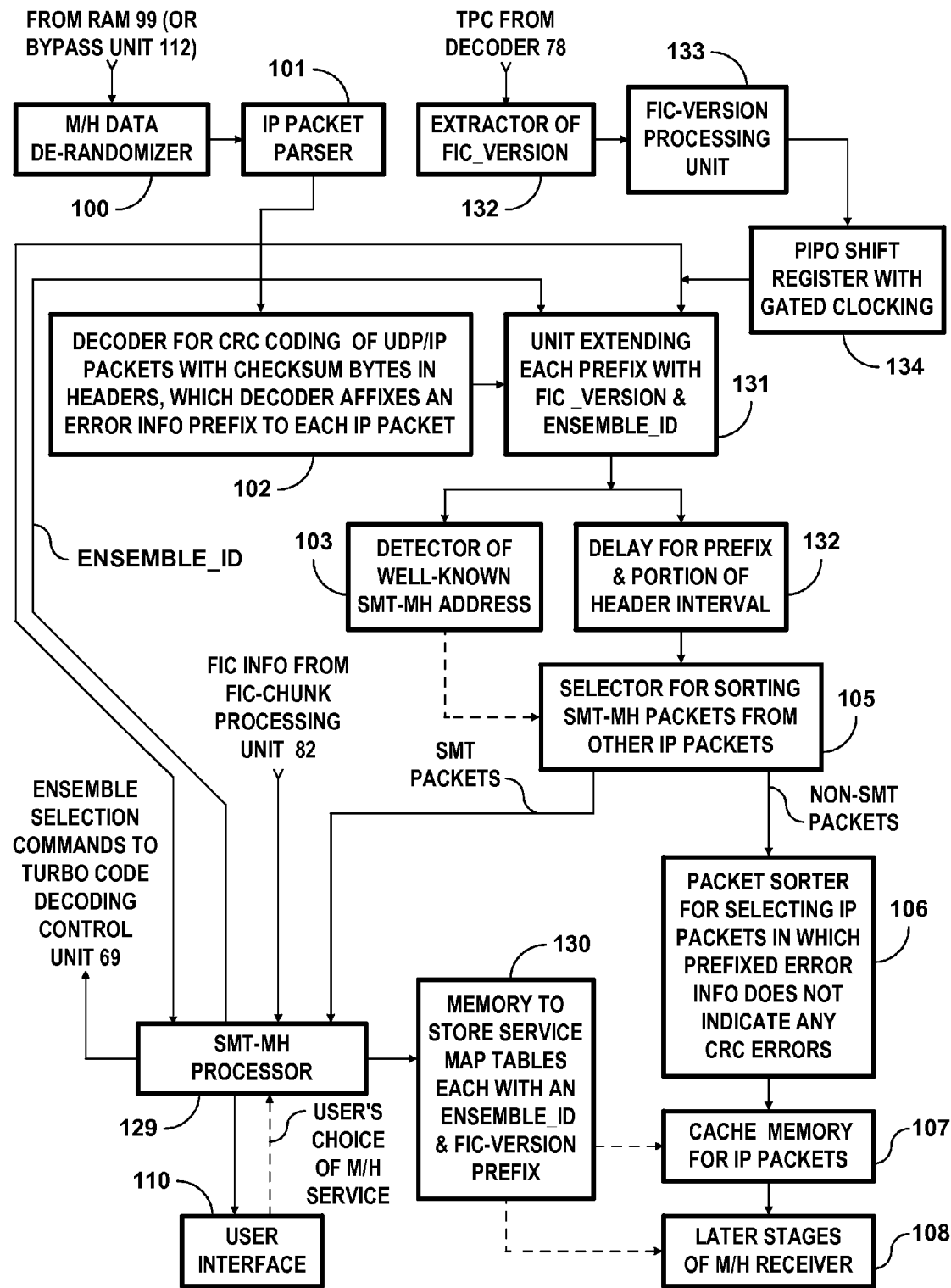

FIG. 12 is an alternative receiver portion that replaces the FIG. 7D portion of the FIG. 7A M/H receiver in currently preferred M/H receiver designs.

Figure 13:
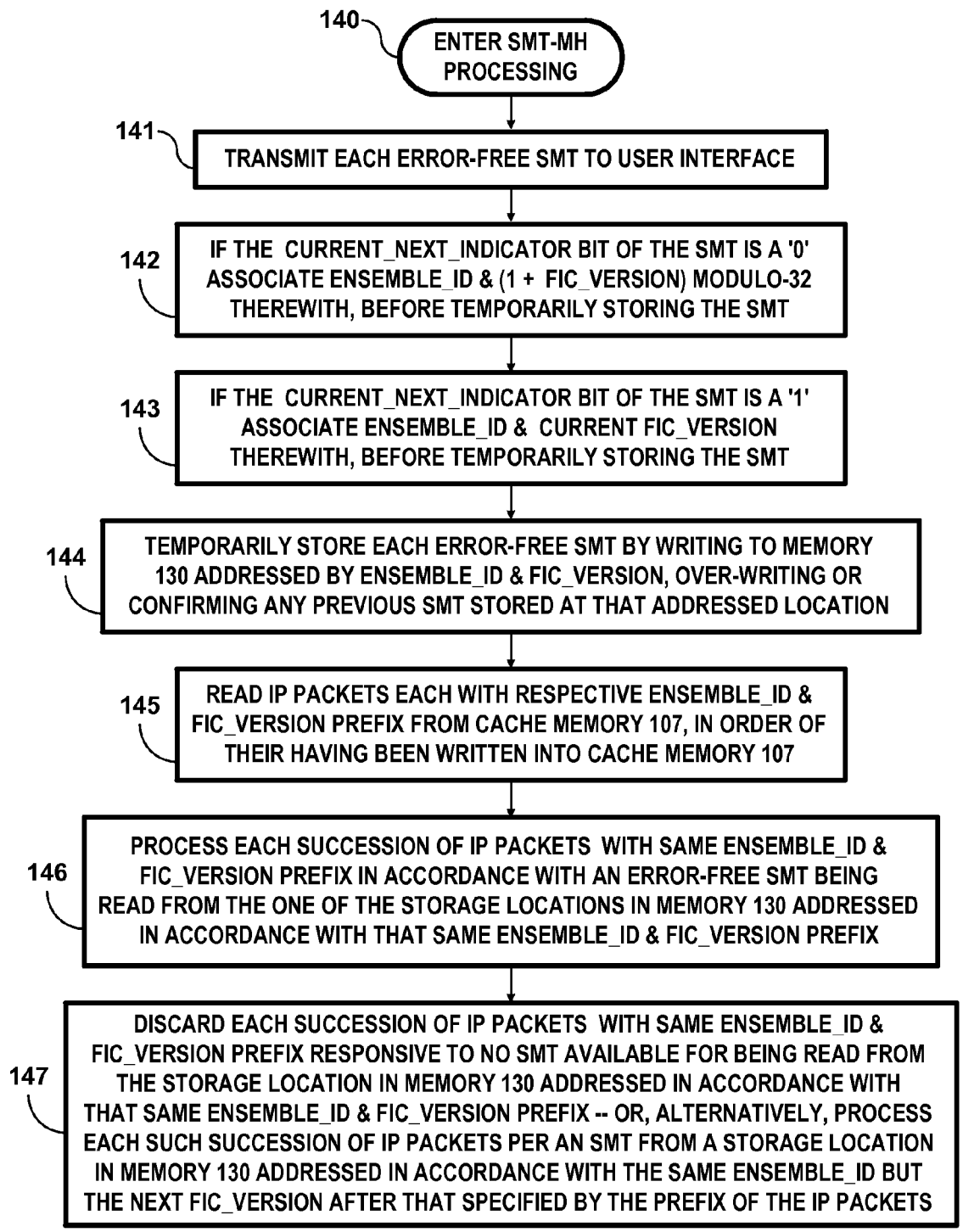

FIG. 13 is a flowchart illustrating one way to operate the SMT-MH processor 129, memory 130 for SMT-MH packets, and cache memory 107 in the FIG. 12 receiver portion.

Figure 14:
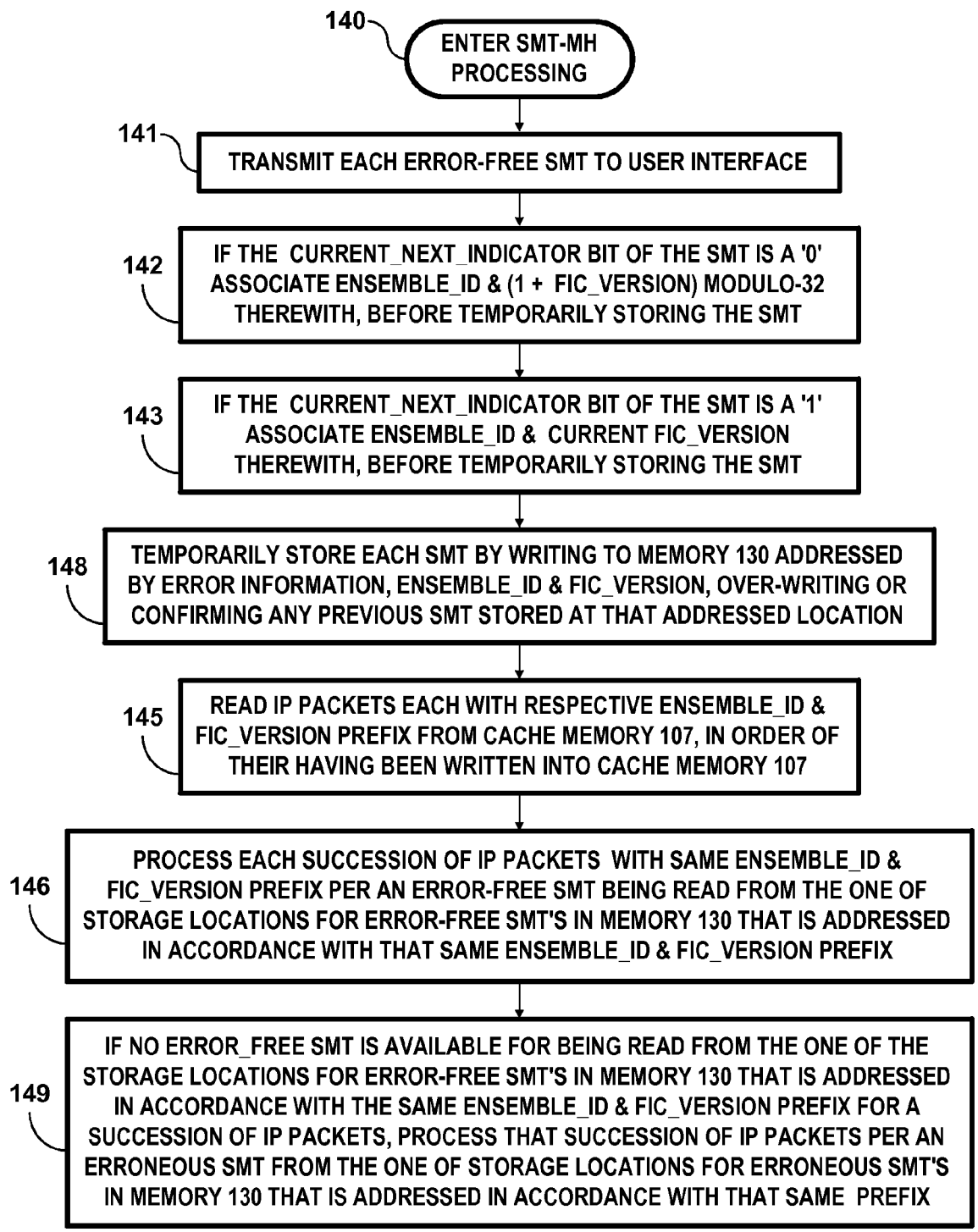

FIG. 14 is a flowchart illustrating another way to operate the SMT-MH processor 129, memory 130 for SMT-MH packets, and cache memory 107 in the FIG. 12 receiver portion.

DETAILED DESCRIPTIONS OF EXEMPLARY EMBODIMENTS

Certain exemplary embodiments of the present inventive concept will now be described in greater detail with reference to the accompanying drawings.

The matters defined in the following descriptions, such as detailed construction and elements, are provided to assist in a comprehensive understanding of the inventive concept. Thus, it is apparent that the exemplary embodiments can be carried out without those specifically defined matters. Also, well-known functions or constructions are not described in detail since they would obscure the invention with unnecessary detail.

A mobile/handheld (M/H) system specified by A/153 provides M/H broadcasting services using a portion of 19.39 Mbps ATSC 8-VSB transmission, while the remainder is still available for high-definition or multiple standard-definition TV services. The M/H system is a dual-stream system providing ATSC service multiplex data streams for existing DTV services and M/H-service main-service multiplex data streams for one or more M/H services.

FIG. 1 is a schematic diagram of a related-art transmission apparatus 1000 for broadcasting DTV signals to M/H receivers, using serial concatenated convolutional coding (SCCC) of M/H-service data. The transmission apparatus 1000 receives two sets of input streams: one includes MPEG transport stream (TS) packets of main-service data and the other includes M/H-service data. The M/H-service data are encapsulated in MPEG-2-like TS packets before emission, which MPEG-2-like TS packets have been called "M/H encapsulating packets" or more simply "MHE packets". This avoids disrupting reception of the main-service data by legacy 8-VSB receivers. M/H-service data could be carried in MPEG TS packets, such as MPEG-2 video/audio or MPEG-4 video/audio, but the decision within ATSC is that it be carried by Internet-Protocol (IP) packets. The transmission apparatus 1000 combines MPEG TS packets of the main-service data and IP TS packets of the M/H-service data within one stream of MPEG or MPEG-like TS packets. Then, the FIG. 1 transmission apparatus processes the combined stream for transmission as an ATSC trellis-coded 8-VSB signal. An M/H Frame controller apparatus 1 as shown in FIG. 1 controls the foregoing operations.

Referring to FIG. 1, the main-service multiplex stream of data is supplied to a packet timing and program clock reference (PCR) adjustment circuitry 2 before the packets of that stream are routed to a packet multiplexer 3 to be time-division multiplexed with packets encapsulating M/H-service data, i.e., MHE packets. Because of their time-division multiplexing with the MHE packets, changes have to be made to the time of emission of the main-service stream packets compared to the timing that would occur with no M/H stream present. The packet timing and PCR adjustment circuitry 2 makes these timing changes responsive to control signals supplied thereto from the M/H Frame controller apparatus 1. The packet multiplexer 3 time-division multiplexes the main-service TS packets with the MHE packets, as directed by control signals from the M/H Frame controller apparatus 1. The transmission apparatus 1000 includes an M/H pre-processor 4 and an M/H post-processor 5.

A function of the M/H pre-processor 4 is to rearrange the M/H-service data into an M/H data structure, to enhance robustness of the M/H-service data by additional forward error correction (FEC) processes, to insert training sequences, and subsequently to encapsulate the processed enhanced data within MHE packets, thereby to generate the ancillary TS, that is, MHE packets. The operations performed by the M/H pre-processor 4 include M/H Frame encoding, block processing, Group formatting, packet formatting and M/H signaling encoding. The M/H Frame controller apparatus 1 provides necessary transmission parameters to the M/H pre-processor 4 and controls the packet multiplexer 3 to multiplex the main-service TS packets and the MHE packets to organize the M/H Frame.

A function of the post-processor 5 is to process the main-service data by normal 8-VSB encoding and to re-arrange the pre-processed M/H-service data in a combined stream to ensure backward compatibility with the ATSC 8-VSB. The main-service data in the combined stream are processed exactly the same way as for normal 8-VSB transmission: randomizing, Reed-Solomon (RS) encoding, convolutional byte interleaving and trellis encoding. The M/H-service data in the combined stream are processed differently from the main-service data, with the pre-processed M/H-service data bypassing data randomization. The pre-processed M/H-service data is subjected to non-systematic RS encoding, which re-arranges the bytes of that data. The non-systematic RS encoding allows insertion of regularly spaced long training sequences without disturbing legacy receivers. Additional operations are done on the pre-processed M/H-service data to initialize memories of a modified trellis encoder 15 at the beginning of each training sequence included in the pre-processed M/H-service data.

More specifically, the M/H-service multiplex stream of data is supplied to the M/H pre-processor 4 for processing and subsequent encapsulation of M/H-service data in payload fields of MHE packets. The MHE packets are supplied to the packet multiplexer 3 after data encapsulation within their payload fields is completed.

Still more specifically, the M/H-service multiplex stream of data is supplied to an M/H Frame encoder 6 which provides transverse Reed-Solomon (TRS) coding of data packets. The data packets are also subjected to periodic cyclic-redundancy-check (CRC) coding to locate byte errors in the TRS coding. Each M/H Frame is composed of one or two frames of the TRS coding, and the data in each frame of the TRS-CRC coding are randomized independently from each other and from the data of the main-service multiplex. FIG. 1 indicates that the M/H Frame encoder 6 is of the sort shown in FIG. 2 of the drawing, which is in accordance with an aspect of the present inventive concept.

The M/H Frame encoder 6 is connected for supplying packets of M/H-service data to a block processor 7, as an input signal thereto. The block processor 7 includes encoders for each type of single-phase outer convolutional coding used in the SCCC and respective subsequent interleavers for successive two-bit nibbles of each type of single-phase outer convolutional coded data.

A Group formatter 8 is connected for receiving the interleaved outer convolutional coded data from the block processor 7 as an input addressing signal. The Group formatter 8 includes an interleaved Group format organizer that operates on the Group format as it will appear after the ATSC data interleaver The interleaved Group format organizer maps the FEC coded M/H-service data from the block processor into corresponding M/H blocks of a Group, adding pre-determined training data bytes and data bytes to be used for initializing the memories of the modified trellis encoder 15. The interleaved Group format organizer inserts three-byte headers for the MHE packets. The interleaved Group format organizer also inserts place-holder bytes for main-service data and for non-systematic RS parity. The interleaved Group format organizer adds some dummy bytes to complete construction of the intended Group format. The interleaved Group format organizer assembles a Group of 118 consecutive MHE packets. Some of these MHE packets are composed of the interleaved outer convolutional coding supplied by the block processor 7. Others of these MHE packets are prescribed training signals stored in a read-only memory within the Group formatter 8 and inserted at prescribed intervals within the Group. Still others of these MHE packets are generated by a signaling encoder 9.

The M/H transmission system has two kinds of signaling channels generated by the signaling encoder 9. One is the Transmission Parameter Channel (TPC), and the other is the Fast Information Channel (FIC). The TPC is for signaling the M/H transmission parameters such as various FEC modes and M/H Frame information. The FIC is provided to enable fast service acquisition M/H receivers and it contains cross layer information between a physical layer of the receivers and their upper layer(s). TPC signaling and FIC signaling are transmitted in every M/H Group, that is, twice in each 8-VSB data field, beginning in its 17th data segment and in its 173rd data segment.

Within the Group formatter 8, the interleaved Group format organizer is followed in cascade connection by a byte de-interleaver that complements the ATSC convolutional byte interleaver. The Group formatter 8 is connected for supplying a response of this byte de-interleaver as its output signal, which is applied as an input signal to a packet formatter 10. Initially, the packet formatter 10 expunges the main-service data place holders and the RS parity place holders that were inserted by the interleaved Group format organizer for proper operation of the byte de-interleaver in the Group formatter 8. The packet formatter 10 inserts an MPEG TS sync byte before each 187-byte data packet as a prefix thereof. The packet formatter 10 supplies 118 M/H-data-encapsulating TS packets (i.e, MHE packets) per Group to the packet multiplexer 3, which time-division multiplexes the MHE packets and the main-service TS packets to construct M/H Frames.

The M/H Frame controller apparatus 1 controls the packet multiplexer 3 in the following way when the packet multiplexer schedules the 118 MHE packets from the packet formatter 10. 37 packets immediately precede a data field synchronization (DFS) segment in a 313-segment VSB field of data, and 81 packets immediately succeed that DFS segment. The packet multiplexer 3 reproduces next-in-line main-service TS packets in place of MPEG null packets that contain place-holder bytes for main-service data in their payload fields. The packet multiplexer 3 is connected to supply TS packets it reproduces to the post-processor 5 as an input signal thereto.

More specifically, the packet multiplexer 3 is connected to apply the TS packets it reproduces to a conditional data randomizer 11. The conditional data randomizer 11 suppresses the sync bytes of the 188-byte TS packets and randomizes the remaining data in accordance with conventional 8-VSB practice, but only on condition that the TS packets are not encapsulated M/H-service data. The encapsulated M/H-service data bypass data randomization. The other remaining data are randomized per A/53, Annex D, §4.2.2.

A systematic and non-systematic (207, 187) RS encoder is connected to receive, as its input signal, the 187-byte packets that the conditional data randomization 11 reproduces with conditional data randomization. The RS parity generator polynomial and the primitive field generator for the RS encoder 12 are the same as those A/53, Annex D, FIG. 5 prescribes for (207, 187) RS coding. When the RS encoder 12 receives a main-service data packet, the RS encoder 12 performs a systematic RS coding process prescribed in A/53, Annex D, §4.2.3, appending twenty bytes of RS parity data to a conclusion of the 187-byte packet. When the RS encoder 12 receives an MHE packet, the RS encoder 12 performs a non-systematic RS encoding process. The twenty bytes of RS parity data obtained from the non-systematic RS encoding process are inserted in a prescribed parity byte location within the MHE packet.

A convolutional byte interleaver 13 is connected for receiving as its input signal the 207-byte RS codewords that the RS encoder 12 generates. The byte interleaver 13 is generally of the type specified in A/53, Annex D, §4.2.4. The byte interleaver 13 is connected for supplying byte-interleaved 207-byte RS codewords via an RS parity replacer 14 to a modified trellis encoder 15. The basic trellis encoding operation of the modified trellis encoder 15 is similar to that specified in A/53, Annex D, §4.2.4. The trellis encoder 15 converts byte-unit data from the byte interleaver 13 to symbol units and performs a 12-phase trellis coding process per Section 6.4.1.4 Main Service Trellis Coding of A53-Part-2-2007. In order for output data of the trellis encoder 15 to include pre-defined known training data, initialization of the memories in the trellis encoder 15 is required. This initialization is very likely to cause the RS parity data calculated by the RS encoder 12 prior to the trellis initialization to be erroneous. The RS parity data must be replaced to ensure backwards compatibility with legacy DTV receivers. Accordingly, the trellis encoder is connected for supplying the changed initialization byte to a non-systematic RS encoder 16, which re-calculates the RS parity of the affected MHE packets. The non-systematic RS encoder 16 is connected for supplying the re-calculated RS parity bytes to the RS parity replacer 14, which substitutes the re-calculated RS parity bytes for the original RS parity bytes before they can be supplied to the modified trellis encoder 15. That is, the RS parity replacer 14 reproduces the output of the byte interleaver 13 as the data bytes for each packet in its output signal, but reproduces the output of the non-systematic RS encoder 16 as the RS parity for each packet in its output signal. The RS parity replacer 14 is connected to supply the resulting packets in its output signal to the modified trellis encoder 15 as the input signal thereto.

A synchronization multiplexer 17 is connected for receiving as the first of its two input signals 2/3 trellis-coded data generated by the modified trellis encoder 15. The sync multiplexer 17 is connected for receiving its second input signal from a generator 18 of synchronization signals comprising data segment synchronization (DSS) and the data field synchronization (DFS) signals. The DSS and DFS signals are time-division multiplexed with the 2/3 trellis-coded data per custom at the sync multiplexer 17, which is supplied to a pilot inserter 19 as an input signal thereto. The pilot inserter 19 introduces a direct-component offset into the input signal for the purpose of generating a pilot carrier wave during subsequent balanced modulation of a suppressed intermediate-frequency (IF) carrier wave. An output signal from the pilot inserter 19 is a modulating signal, which optionally is passed through a pre-equalizer filter 20 before being supplied as an input signal to an 8-VSB exciter 21 to modulate the suppressed IF carrier wave. The 8-VSB exciter 21 is connected for supplying the suppressed IF carrier wave to a radio-frequency (RF) up-converter 22 to be converted upward in frequency to repose within a broadcast channel. The up-converter 22 also amplifies power of an RF signal that it applies to the broadcast antenna 23.

Figure 2:
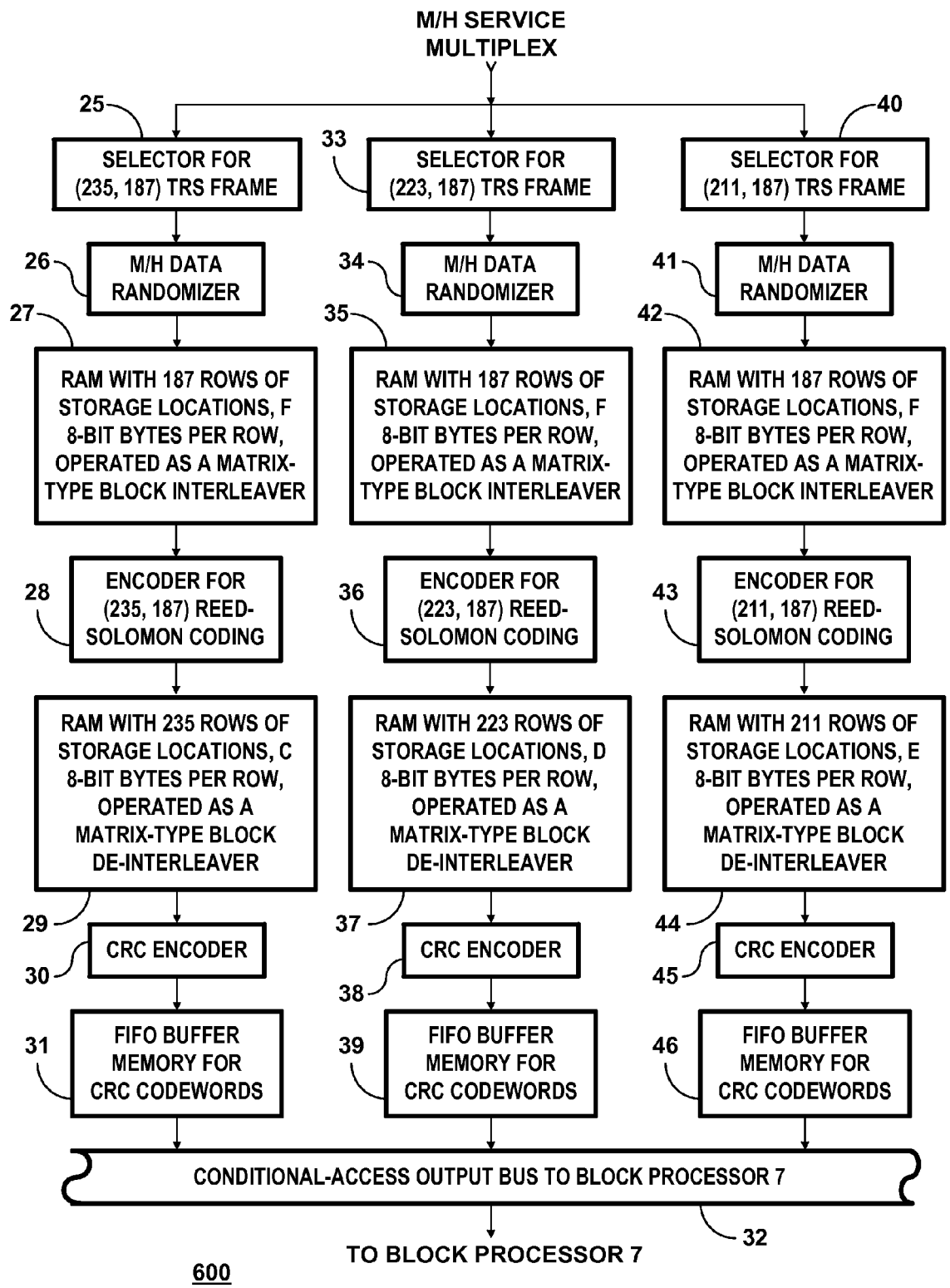
FIG. 2 is a schematic diagram of a portion 600 of an M/H Frame encoder that can be used as the M/H Frame encoder 6 in the FIG. 1 transmitter apparatus.

FIG. 2 is a schematic diagram of an M/H Frame encoder 600 according to an exemplary embodiment of the present inventive concept. The M/H Frame encoder 600 may be an improvement from the M/H Frame encoder 6 of the transmission apparatus 1000 as shown in FIG. 1. The M/H Frame encoder 600 includes a selector 25 connected for selectively reproducing portions of an IP M/H-service multiplex signal for application to an M/H data randomizer 26 as an input signal thereto. The M/H data randomizer 26 exclusive-ORs these reproduced portions of the IP M/H-service multiplex signal with a prescribed pseudo-random binary sequence (PRBS) for generating a randomized IP signal supplied as a write-input signal to a random-access memory (RAM) 27. The RAM 27 may have 187 rows of storage locations capable of storing a number F of eight-bit bytes per row. The RAM 27 is operated as a matrix-type block interleaver in which columns of 181 bytes are read to an encoder 28 that generates a respective (235, 187) RS codeword responsive to each column of 187 bytes read thereto. That is, the RAM 27 is written row by row with successive bytes of IP packets. When writing or over-writing of the storage locations in the RAM 27 has been completed, those bytes are subsequently read column by column to the encoder 28. The encoder 28 is connected for writing the (235, 187) RS codewords it generates to a RAM 29 operated as a matrix-type block de-interleaver. FIG. 2 shows the RAM 29 as having 235 rows of storage locations capable of storing the number F of eight-bit bytes per row. The bytes of the successive (235, 187) RS codewords generated by the encoder 28 are written column by column into the RAM 29. When writing or over-writing of the storage locations in the RAM 29 has been completed, those bytes are subsequently read row by row to a CRC encoder 30. The CRC encoder 30 appends two bytes of CRC parity to a conclusion of every chunk of bytes read from a respective row of the RAM 29, thereby generating a respective CRC codeword. The CRC encoder 30 is connected for writing the CRC codewords it generates to a FIFO buffer memory 31 for CRC codewords. The FIFO buffer memory 31 is connected for supplying those CRC codewords to a conditional-access output bus 32 to the block processor 7 of the transmission apparatus 1000 as shown in FIG. 1.

The M/H Frame encoder 600 includes a selector 33 connected for selectively reproducing portions of the IP M/H-service multiplex signal for application to an M/H data randomizer 34 as an input signal thereto. The M/H data randomizer 34 exclusive-ORs these reproduced portions of the IP M/H-service multiplex signal with a prescribed PRBS for generating a randomized IP signal supplied as a write-input signal to a RAM 35. FIG. 2 shows the RAM 35 as having 187 rows of storage locations capable of storing the number F of eight-bit bytes per row. The RAM 35 is operated as a matrix-type block interleaver in which columns of 187 bytes are read to an encoder 36 that generates a respective (223, 187) RS codeword responsive to each column of 187 bytes read thereto. That is, the RAM 35 is written row by row with successive bytes of IP packets. When writing or over-writing of the storage locations in the RAM 35 has been completed, those bytes are subsequently read column by column to the encoder 36. The encoder 36 is connected for writing the (223, 187) RS codewords it generates to a RAM 37 operated as a matrix-type block de-interleaver. FIG. 2 shows the RAM 37 as having 223 rows of storage locations capable of storing the number F of eight-bit bytes per row. The bytes of the successive (223, 187) RS codewords generated by the encoder 36 are written column by column into the RAM 37. When writing or over-writing of the storage locations in the RAM 37 has been completed, those bytes are subsequently read row by row to a CRC encoder 38. The CRC encoder 38 appends two bytes of CRC parity to a conclusion of every chunk of bytes read from a respective row of the RAM 37, thereby generating a respective CRC codeword. The CRC encoder 38 is connected for writing the CRC codewords it generates to a FIFO buffer memory 39 for CRC codewords. The FIFO buffer memory 39 is connected for supplying those CRC codewords to the conditional-access output bus 32.

The M/H Frame encoder 600 includes a selector 40 connected for selectively reproducing portions of the IP M/H-service multiplex signal for application to an M/H data randomizer 41 as an input signal thereto. The M/H data randomizer 41 exclusive-ORs these reproduced portions of the IP M/H-service multiplex signal with a prescribed PRBS for generating a randomized IP signal supplied as write-input signal to a random-access memory 42. FIG. 2 shows the RAM 42 as having 187 rows of storage locations capable of storing the number F of eight-bit bytes per row. The RAM 42 is operated as a matrix-type block interleaver in which columns of 187 bytes are read to an encoder 43 that generates a respective (211, 187) RS codeword responsive to each column of 187 bytes read thereto. That is, the RAM 42 is written row by row with successive bytes of IP packets. When writing or over-writing of the storage locations in the RAM 42 has been completed, those bytes are subsequently read column by column to the encoder 43. The encoder 43 is connected for writing the (211, 187) RS codewords it generates to a RAM 44 operated as a matrix-type block de-interleaver. FIG. 2 shows the RAM 44 as having 211 rows of storage locations capable of storing the number F of eight-bit bytes per row. The bytes of the successive (211, 187) RS codewords generated by the encoder 43 are written column by column into the RAM 44. When writing or over-writing of the storage locations in the RAM 44 has been completed, those bytes are subsequently read row by row to a CRC encoder 45. The CRC encoder 45 appends two bytes of CRC parity to the conclusion of every chunk of bytes read from a respective row of the RAM 44, thereby generating a respective CRC codeword. The CRC encoder 45 is connected for writing the CRC codewords it generates to a FIFO buffer memory 46 for CRC codewords. The FIFO buffer memory 46 is connected for supplying those CRC codewords to the conditional-access output bus 32.

Figure 3:
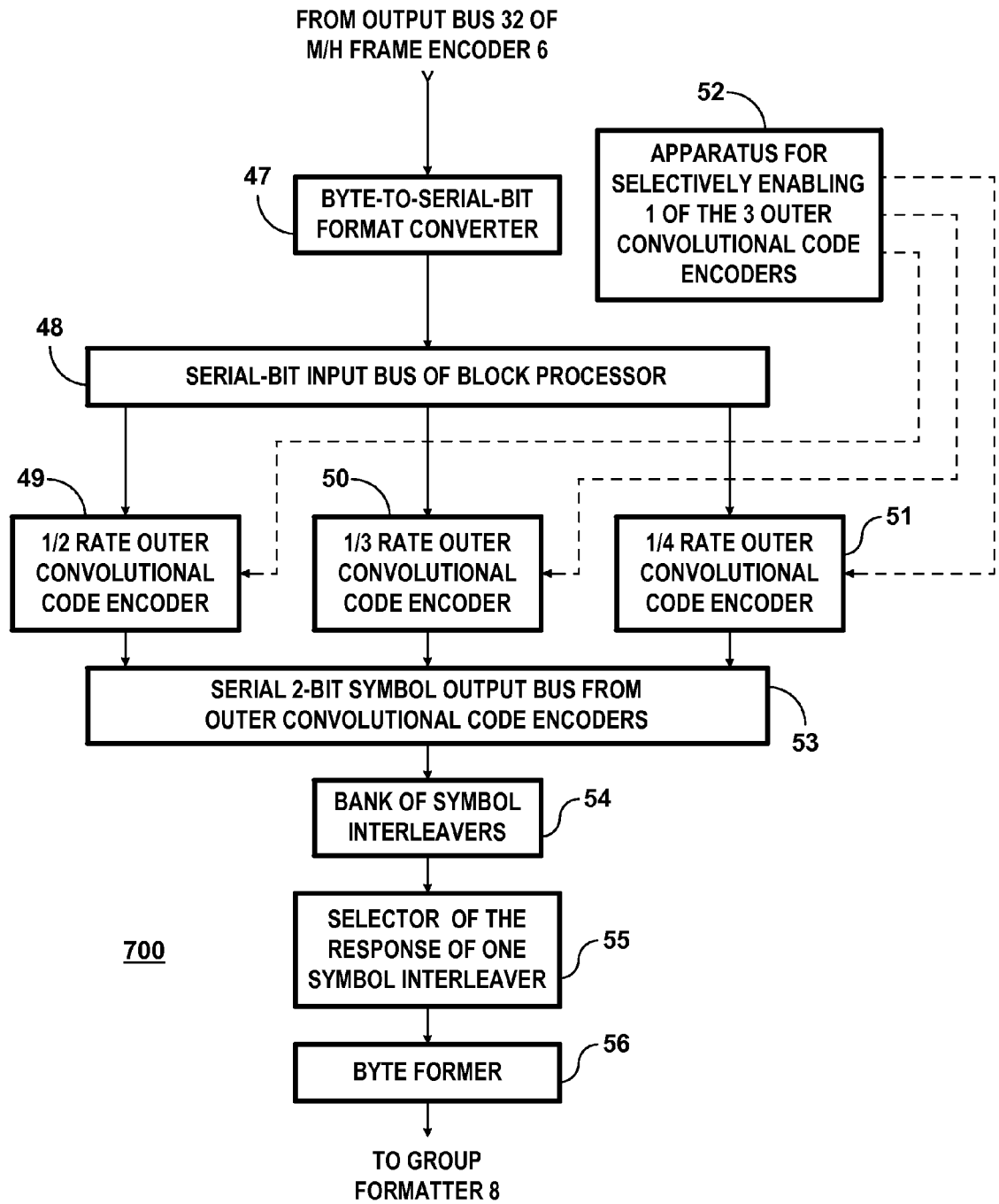
FIG. 3 is a schematic diagram of a representative embodiment of the block processor in the FIG. 1 DTV transmitter apparatus.

FIG. 3 is a schematic diagram of a block processor 700 according to an exemplary embodiment of the present inventive concept. The block processor 700 may be an improvement from the block processor 7 of the transmission apparatus 1000 as shown in FIG. 1. The output bus 32 of the M/H Frame encoder 600 is connected for supplying its output signal in eight-bit byte format as an input signal to a byte-to-serial-bit format converter 47. The format converter 47 is connected for supplying an output signal of the M/H Frame encoder 600, as converted to a serial-bit format, to a serial-bit input bus 48 of the block processor 700. The input bus 48 is connected to convey the output of the M/H Frame encoder 600, as converted to the serial-bit format to encoders 49, 50 and 51 as their respective input signals. The encoders 49, 50 and 51 shown in FIG. 3 perform one-half-rate outer convolutional coding, one-third-rate outer convolutional coding and one-quarter outer convolutional coding, respectively. FIG. 3 shows an apparatus 52 for selectively enabling one of the three encoders 49, 50 and 51 one at a time. If the encoders 49, 50 and 51 have separate physical structures, the apparatus 52 for selectively enabling an operation can, by way of example, be such as to supply operating power to only a selected one of the three encoders 49, 50 and 51. In actual practice, the encoders 49, 50 and 51 may use elements in common as described in the above-referenced document titled "MPH Physical Layer Technical Disclosure". In such case the apparatus 52 may comprise multiplexers for selecting an outer convolutional coding with a desired rate. FIG. 3 shows the encoders 49, 50 and 51 connected for supplying serial two-bit symbols to a serial two-bit symbol output bus 53 for subsequent application to a bank 54 of symbol interleavers. A selector 55 is connected for supplying an output of one of the symbol interleavers to a byte former 56, which converts the output of a selected symbol interleaver into eight-bit bytes for application to the Group formatter 8 of the transmission apparatus 1000 of FIG. 1, as one of the input signals thereto.

FIGS. 4A and 4B are tables showing a syntax of bits in Transmission Parameter Channel (TPC) data, which syntax corresponds to that specified in A/153 as of September 2009. There are 80 bits in the TPC data transmitted with each Group, and they are referred to by number according to the order of their transmission. The syntax shown in FIGS. 4A and 4B uses bits 50-80 that are "reserved" bits in the TPC data of the originally proposed M/H standard. Bits 1-49 transmit parameters corresponding to those transmitted in bits 1-49 of the TPC data specified in the M/H standard as originally proposed. The sub-Frame-number specified by bits 1-3 and the Slot number specified by bits 4-7 are each values of a respective increasing count, which permits them to be received with greater reliability than they are isolated parameters. The Parade-id specified by bits 8-14 and the prader_repetition_cycle_minus_1 specified by bits 22-24 do not change respective values during an M/H Frame and are transmitted in each of the several M/H Groups that belong to the Parade. The repeated transmission of the same Parade-id and the same Parade-repetition_cycle_minus_1 permits each of them to be received more reliably than if it were transmitted just once. Parameters for each Parade specified by bits 15-21, 25-40 and 50-54 do not change values over five successive sub-Frames of each M/H Frame, and are transmitted repeatedly in all Groups belong to the Parade, which permits them to be received with greater reliability than they are isolated parameters. The first three of these five successive sub-Frames conclude one of the successive M/H Frames, and the final two of these five successive M/H sub-Frames begin the next M/H Frame.

Some of the TPC parameters are signaled in advance in the M/H standard as originally proposed and are similarly signaled in the syntax of TPC data bits depicted in the FIG. 4A and FIG. 4B tables. The starting_Group_number (SGN) specified by bits 15-18, the number_of_Groups (NoG) specified by bits 19-21, the FEC modes specified by bits 22-40 and the total_number_of_Groups (TNOG) specified by bits 50-54 have values corresponding to the current M/H Frame during the initial two sub-Frames of that M/H Frame. However, their values correspond to the subsequent M/H Frame during the final three sub-Frames of an M/H Frame. So, the parameters for each Parade specified by bits 15-21, 25-40 and 50-54 do not change values over five successive sub-Frames and are transmitted repeatedly in all the Groups belong to the Parade. This permits them to be received with greater reliability than they are transmitted just once.

The TNoG in a sub-Frame remains the same in all five sub-Frames of an M/H Frame. Knowledge of TNoG is needed for operation of the de-interleaver for FIC signaling. TNoG can be calculated by counting the number of M/H Groups in a sub-Frame, detecting the presence of M/H Groups by detecting the training signal each includes, for example. However, receiver construction is simpler if TNoG is specified in TPC data. In mid-July of 2008, the originally proposed M/H standard was modified in regard to TPC data specification, such that bits 50-54 would specify TNoG Bits 50-54 of the TPC data in the initial sub-Frames #0 and #1 of each successive M/H Frame specified TNoG for the M/H Frame being currently transmitted. Bits 50-54 of TPC data in the final sub-Frames #2, #3 and #4 of each successive M/H Frame specified TNoG for the M/H Frame next to be transmitted. Bits 50-54 continue to be specified this way in A/153 as published in September 2009.

In 2009, the inventor proposed that bits 55-59 of TPC data in each of the final sub-Frames #2, #3 and #4 of each M/H Frame also specify TNoG for the M/H Frame being currently transmitted. Signaling TNoG for the M/H Frame being currently transmitted in every one of its five sub-frames benefits receivers for M/H signals. Such signaling facilitates the operation of the de-interleaver for FIC signaling in an M/H receiver when only the final three sub-Frames of an M/H Frame are successfully received, a condition that is apt to occur after a change in the selection of an RF channel to be received. This can increase the likelihood of successful reception an FIC chunk concerning a next M/H Frame being achieved earlier in time, which can allow more rapid acquisition of reception of a newly tuned RF signal or re-acquisition of reception of an RF signal interrupted by loss of signal strength. This proposal was accepted by others in an ATSC ad hoc group and is incorporated in A/153 as published in September 2009. The inventor further proposed that bits 55-59 of TPC data in each of the initial sub-Frames #0 and #1 of each M/H Frame specify TNoG for an immediately previous M/H Frame or for a next M/H Frame. These proposals were opposed by others in the ATSC ad hoc group as being unnecessary, and neither of these proposals was incorporated into A/153.

Decisions were made in the ATSC to use the last five bits of the TPC data to signal the version of that data that is being used. Bits 76 and 77 signal major changes in the TPC data used in the M/H standard, which changes cause the TPC data to be indecipherable to receivers designed for receiving transmissions made in accordance with earlier versions of the M/H standard. Bits 78, 79 and 80 signal minor changes in the TPC data used in the M/H standard, which changes leave parts of the TPC data decipherable to receivers designed for receiving transmissions made in accordance with earlier versions of the M/H standard. In the initial version of A/153, bits 78, 79 and 80 are all ONEs, each of them to roll to ZERO when the first change in the TPC data version is adopted by the ATSC. In the initial version of A/153, bits 76 and 77 are both ONEs, each of them to roll to ZERO when the initial major change in the TPC data version is adopted by the ATSC.

FIG. 6 shows how the TPC data parameters specified in FIGS. 4A and 4B tables are transmitted. FIG. 5 illustrates the advanced signaling of TPC data, according to an exemplary embodiment of the present inventive concept. Preferably, but not necessarily, the signaling of the FIC data is advanced so that it applies to a succeeding M/H Frame during later sub-Frames of the M/H Frame being currently received.

FIG. 6 is a schematic diagram of a signaling encoder 900 according to an exemplary embodiment of the present inventive concept. The signaling encoder 900 may be an improvement from the signaling encoder 9 of the transmission apparatus 1000 as shown in FIG. 1. The signaling encoder 900 comprises an encoder 57 for (18, 10) RS encoder for TPC data and an encoder 58 for (51, 37) RS encoder for FIC data. The encoder 58 encodes 37 bytes per Group and is connected for supplying resulting 51 bytes of RS-coded FIC data to a matrix-type block interleaver 59. A time-division multiplexer 60 is connected for supplying an output from interleaving the 51 bytes of the RS-coded FIC data at a first input port of the multiplexer 60, and supplying an 18-byte RS codeword received from the encoder 57 at a second input of the multiplexer 60. The multiplexer 60 is connected for supplying its output to a signaling randomizer 61. The signaling randomizer 61 is connected for supplying its output as an input signal to a quarter-rate PCCC encoder 62, which is in turn connected to supply the quarter-rate parallel concatenated convolutional coding (PCCC) that it generates to the Group formatter 8 of the transmission apparatus of FIG. 1.

FIG. 7A is an assembly drawing that shows how FIGS. 7B, 7C and 7D are combined to provide a schematic diagram of an M/H receiver 2000 for receiving M/H transmissions sent over the air from the transmission apparatus of FIG. 1. FIGS. 7B, 7C and 7D illustrate respective portions of the M/H receiver 2000 according to an exemplary embodiment of the present inventive concept. The FIG. 7B portion of the M/H receiver 2000 includes a VSB amplitude-modulation (AM) DTV receiver front-end 63 for selecting an RF DTV signal for reception, converting the selected RF DTV signal to an intermediate-frequency (IF) DTV signal, and amplifying the IF DTV signal. An analog-to-digital (A/D) converter 64 is connected for digitizing the amplified IF DTV signal supplied from the VSB AM DTV receiver front-end 63. A VSB AM demodulator 65 is connected for demodulating the digitized IF DTV signal to generate a digitized baseband DTV signal. The VSB AM DTV receiver front-end 63, the A/D converter 64, and the VSB AM demodulator 65, in combination, receive a selected 8-VSB signal as transmitted in 8-VSB modulation of a RF carrier wave within a respective frequency channel and convert it to digital samples of a baseband signal. These digital samples of a baseband signal are supplied to an equalization filtering unit 66 for equalization of a channel response and for rejection of a co-channel interfering a National Television System(s) Committee (NTSC) signal. A synchronization signals extraction unit 67 is connected for receiving an output of the equalization filtering unit 66. Responsive to DFS signals, the sync signals extraction unit 67 detects beginnings of data frames and fields. Responsive to DSS signals, the sync signals extraction unit 67 detects beginnings of data segments. The M/H receiver 2000 of FIG. 7A uses the DSS and DFS signals for controlling its operations in a similar manner that is done in related-art DTV receivers. FIGS. 7B, 7C and 7D may not explicitly show an arrangements for effecting these operations.

A detector 68 for detecting a type of ancillary transmission responds to eight-bit sequences contained in final portions of reserved portions of DFS signals separated by the sync signal extraction unit 67. The detector 68 is connected for indicating the type of ancillary transmission to a turbo code decoding control unit 69 that controls turbo decoding in the M/H receiver 2000 of FIG. 7A. The type of ancillary transmission that the detector 68 detects may be one that conditions the detector 68 to extract further information concerning the ancillary transmission from initial portions of the reserved portions of DFS signals separated by the sync signal extraction unit 67. The detector 68 is connected for supplying such further information to the turbo code decoding control unit 69. Most of the connections of the turbo code decoding control unit 69 to elements involved in decoding the SCCC'd signal are not explicitly shown in FIGS. 7B, 7C and 7D, so as to keep those figures from being too cluttered to be understood readily.

The FIG. 7B portion of the M/H receiver 2000 includes a 12-phase trellis decoder 70 connected for receiving an output signal from the equalization filtering unit 66. The 12-phase trellis decoder 70 is connected for supplying trellis-decoding results to a convolutional byte de-interleaver 71. The convolutional byte de-interleaver 71 provides byte-by-byte de-interleaving of these results to generate an input signal for an RS decoder 72 for the de-interleaved (207, 187) RS FEC codewords supplied from the convolutional byte de-interleaver 71. The de-interleaving performed by the convolutional byte de-interleaver 71 complements the convolutional byte interleaving prescribed by A/53, Annex D, §4.2.4. Preferably, but not necessarily, the de-interleaved (207, 187) RS FEC codewords are accompanied by soft-decision information, and the RS decoder 72 is of a sort that can use the soft-decision information to improve overall performance of the trellis decoder 70 and the RS decoder 72. The RS decoder 72 is connected for supplying packets of randomized hard-decision data to a data de-randomizer 73, which exclusive-ORs bits of the randomized hard-decision data with appropriate portions of the PRBS prescribed in A/53, Annex D, §4.2.2 to generate a first TS. This first TS is constituted in part of MPEG-2-compatible packets of de-randomized principal data. Insofar as the RS decoder 72 is capable, it corrects the hard-decision 187-byte randomized data packets that it supplies to the data de-randomizer 73. The output signal from the data de-randomizer 73 reproduces the main-service multiplex TS.

The FIG. 7B portion of the M/H receiver 2000 includes a PCCC gate 74 connected for extracting PCCC'd signal within each M/H Group and reproducing the PCCC'd signal for application as an input signal to a quarter-rate decoder 75 for quarter-rate PCCC decoding. The quarter-rate decoder 75 reproduces a randomized signal decoded (possibly with some errors) from the quarter-rate PCCC decoding, and is connected for supplying that randomized signal as an input signal to a signaling de-randomizer 76. A TPC code gate 77 is connected for extracting TPC code content from a de-randomized signal output from the signaling de-randomizer 76, and for reproducing the TPC code content for application as an input signal to an RS decoder 78 for (18, 10) RS coding. The decoder 78 recovers TPC information and is connected for supplying the TPC information both to the turbo code decoding control unit 69 and to a later portion or portions of the M/H receiver 2000 of FIG. 7A. If current TPC information is transmitted in every M/H Group, the turbo code decoding control unit 69 is able to respond to the TPC information to control selection of a type of outer convolutional decoding to be used on SCCC portions of the M/H Group. The turbo code decoding control unit 69 is further able to specify an apparent structure of an RS Frame that will contain M/H data recovered from turbo decoding the M/H Group or a portion thereof.

The FIG. 7B portion of the M/H receiver 2000 includes an FIC code gate 79 connected for extracting byte-interleaved FIC code content from the de-randomized signal output from the signaling de-randomizer 76, and for reproducing that extracted content for application as a write input signal to a random-access memory 80 operated as a (TNoG x 51) block de-interleaver for block-interleaved segments of (51, 37) Reed-Solomon-coded FIC signal. The (TNoG x 51) block de-interleaver is of a matrix type and complements the block interleaving done by one of the bank 54 of symbol interleavers of the block processor 700 of FIG. 3. A dual-port construction of the RAM 80 is preferred with writing to addressed storage locations being done via the random-access port and with reading being conducted via the serial output port. The RAM 80 is connected for supplying the de-interleaved FIC code output read therefrom to an RS decoder 81 for (51, 37) RS decoding as an input signal thereto. The decoder 81 recovers FIC information and is connected for supplying the FIC information to an FIC-chunk processing unit 82 that compiles the FIC information that is iteratively transmitted during an M/H Frame for application to a later portion or portions of the M/H receiver 2000 of FIG. 7A. This compilation involves parsing of the FIC-chunks, some of which FIC-chunks are apt to span more than one sub-Frame of an M/H Frame, and code-combining of repeatedly transmitted FIC chunks. (FIG. 7D shows the FIC information being supplied from the FIC-chunk processing unit 82 to an SMT-MH processor 109 to be integrated with SMT-MH information during generation of a service map data written into a memory 110 for temporary storage therewithin.)

FIG. 7B shows an extractor 83 of M/H sub-Frame number connected for receiving as its input signal the TPC signal that the decoder 78 for (18, 10) RS coding supplies as an output signal therefrom. The extractor 83 of M/H sub-Frame number is further connected for supplying the FIC-chunk processing unit 82 with the M/H sub-Frame numbers that the extractor 83 extracts from TPC signals. The FIC-chunk processing unit 82 uses the M/H sub-Frame numbers to help parse FIC chunks.

FIG. 7B also shows a TNoG extractor 84 connected for receiving as its input signal the TPC signal that the decoder 78 supplies as an output signal therefrom. The TNoG extractor 84 has a capability to extract current_TNoG_minus_1 information from a respective TPC signal in every M/H Group. That is, it can extract current_TNoG_minus_1 information as well as next_TNoG_minus_1 information from each M/H Group transmitted in one of the final three sub-Frames of an M/H Frame. The TNoG extractor 84 code-combines TNoG_minus_1 information and adds one to the code-combining result to generate TNoG information for application to a read/write control unit 85 as a control input signal thereof. The read/write control unit 85 includes a write-address generator and a read-address generator for the RAM 80, which address generators operate the RAM 80 as a (TNoG x 51) block de-interleaver for block-interleaved segments of (51, 37) RS-coded FIC signal. The TNoG information that the TNoG extractor 84 supplies as a control input signal for the read/write control unit 85 determines the number of FIC-segments (or 51-byte RS codewords) written via the random-access port of the RAM 80 to respective column-addressed byte-storage locations in the RAM 80. The bytes are temporarily stored in the column-addressed byte-storage locations in the RAM 80 for subsequent row-addressed read-out via the serial output port of the RAM 80.

The FIG. 7C portion of the M/H receiver 2000 includes another 12-phase trellis decoder 86 connected for receiving the output from the equalization filtering unit 66 of FIG. 7B. The trellis decoder 86 is further connected as a soft-input, soft-output (SISO) inner decoder in a turbo decoding loop that also includes a SISO outer decoder within a bank 87 of SISO decoders for outer convolutional codes. The trellis decoder 86 and a selected one of the bank 87 of SISO decoders for outer convolutional codes are connected together with elements 88-92 in an SCCC decoder apparatus for responding to digital samples of a baseband signal that comprise SCCC descriptive of IP data packets. This SCCC decoder apparatus reproduces segments of data-randomized IP data packets in its response, some of which are data-randomized SMT-MH packets. The turbo decoding procedures carried out in this SCCC decoder apparatus often involve iterations of decoding the inner convolutional code and the outer convolutional code of the SCCC. The trellis decoder 86 is used for decoding an inner convolutional code of the SCCC, and the selected one of the bank 87 of SISO outer decoders is used for decoding an outer convolutional code of the SCCC. The bank 87 of SISO outer decoders comprises decoders for one-half-rate, one-third-rate and one-quarter-rate outer convolutional coding. Only a selected one of these decoders is conditioned for current decoding by a control signal received from the turbo code decoding control unit 69 via a connection not explicitly shown in FIGS. 7A and 7B. The trellis decoder 86 includes a memory for storing the output of the equalization filtering unit 66 for updating by the extrinsic information. Decoding operations of the trellis decoder 86 and the decoders in the bank 87 are staggered in time. The trellis decoder 86 and the decoders in the bank 87 may be of types that use the soft-output Viterbi algorithm (SOVA) for evaluating trellis codes, but preferably, but not necessarily, are of types that use the logarithmic maximum a posteriori algorithm (log-MAP) for such evaluations. In any case, the trellis decoder 86 and the decoders in the bank 87 each comprises a respective memory for temporary storage of the soft-decisions that they respectively generate.

An outer coding input/output (I/O) interface 88 of FIG. 7C is connected for accessing selected portions of the memory for temporary storage of soft-decisions in the trellis decoder 86 that contain soft-decisions related to the interleaved outer convolutional coding of the SCCC. This outer coding I/O interface 88 includes a memory address generator, an operation of which is controlled by the turbo code decoding control unit 69. Responsive to control by the turbo code decoding control unit 69, the outer coding I/O interface 88 reads soft-decisions related to the reproduced interleaved outer convolutional coding of the SCCC are read from the memory of the trellis decoder 86 to an input port of a de-interleaver 89 of decisions regarding a two-bit-symbol (or bits) via the I/O interface 88. These soft-decisions are also supplied to a first input port of a processor 90 for determining interleaved extrinsic information to be fed back for turbo decoding procedures. These soft-decisions are temporarily stored in the processor 90 for later comparison with an output of an interleaver 91 of decision regarding a two-bit-symbols (or bits) supplied to a second input port of the processor 90.

The de-interleaver 89 is connected for de-interleaving the interleaved outer convolutional coding of the SCCC and supplying soft-decisions related to the de-interleaved outer convolutional coding to the selected one of the bank 87 of SISO outer decoders. The selected one of the bank 87 of SISO outer decoders is connected for supplying soft decisions concerning its decoding results to the two-bit-symbol (or bit) interleaver 91, which is complementary to the de-interleaver 89. The processor 90 compares the interleaved decoding results from the interleaver 91 with the temporarily stored the results from the trellis decoder 86 to generate extrinsic information. This extrinsic information is fed back through the outer coding I/O interface 88 to update the output of the equalization filtering unit 66 that is temporarily stored in selected portions of the memory in the trellis decoder 86 that hold a Group or a portion of the Group that is being turbo decoded.

The FIG. 7C portion of the M/H receiver 2000 includes the bank 87 of SISO outer decoders connected for supplying soft decisions to a hard-decision interface 92 that generates hard decisions responsive to the soft decisions supplied thereto. The hard-decision interface 92 is connected for supplying its output to an eight bit byte former 93 that forms bits from the hard-decision unit 92 into eight-bit bytes. Rows of these eight-bit bytes that will be used for reproducing RS frames are supplied to a decoder 94 for CRC coding and to a byte-organized FIFO memory 95. At a conclusion of each row of the eight-bit bytes the decoder 94 generates, a bit indicating whether or not it found a row probably to contain error. The FIFO memory 95 reproduces each row of eight-bit bytes it receives as delayed by a row interval and supplies those eight-bit bytes to a nine-bit-extended-byte former 96. The extended-byte former 96 appends to each of the (eight) 8-bit bytes the bit indicating whether or not the decoder 94 found the row probably to contain error.

The resulting nine-bit extended bytes are written row by row into respective rows of extended-byte storage locations in a RAM 97 operated to perform a matrix-type block de-interleaving procedure that is a first step of a TRS decoding routine. The RAM 97 is subsequently read one column of nine-bit extended bytes at a time to a selected one of a bank 98 of decoders for (235, 187), (223, 187) and (211, 187) RS codes, respectively. An appropriate decoder is selected by the turbo code decoding control unit 69 responsive to information extracted from the TPC. The extension bits accompanying the eight-bit bytes of the TRS code are used to help locate byte errors for the TRS code. This permits use of an RS algorithm capable of correcting more byte errors than an algorithm that must locate byte errors as well as correct them. The eight-bit data bytes that have been corrected insofar as possible by the selected one of the decoders in the bank 98 are written, column by column, into respective columns of byte-storage locations of a RAM 99. The RAM 99 is operated to perform the matrix-type block re-interleaving procedure for data in further steps of the TRS decoding routine. In a final step of the TRS decoding routine, the byte-storage locations in the RAM 99 are read from row by row to an M/H data randomizer 100 shown in FIG. 7D.

TRS coding can correct drop-outs in received signal strength of a few hundred milliseconds in duration. The TRS coding allows TS packets to be immediately available so long as there is no drop-out in received signal strength. CRC checksums on rows of bytes in an RS framestore can locate rows afflicted by drop-out of received signal strength, doubling capability of an RS code of a given word-length to correct byte errors. When a related-art M/H system was being developed, MPEG-2 packets were used in a TS, and the CRC checksums at the ends of rows were used to validate TS packets in the rows of bytes in RS frames. The IP TS will be the TS used in the M/H standard rather than MPEG-2 TS. When the IP is used, the CRC checksums at the ends of rows are not used to validate TS packets.

TRS coding is used primarily to benefit mobile receivers when traveling a route containing drop-outs in received signal strength. TRS coding will not provide much benefit to a stationary receiver that is in a region of low received signal strength. TRS decoding can be skipped in a receiver designed primarily for a stationary use, such as a laptop computer. As described in a note at bottom right of FIG. 7C, the elements 93, 94, 95, 96, 97, 98 and 99 can be omitted in a receiver designed primarily for a stationary use. The randomized data supplied from the hard-decision unit 92 are then applied directly to the M/H de-randomizer 100 as an input data thereto. Omission of the elements 93, 94, 95, 96, 97, 98 and 99 eliminates latent delay associated with these elements, which will speed an acquisition time of a newly selected sub-channel.

The FIG. 7D portion of the M/H receiver 2000 includes the M/H data de-randomizer 100 that de-randomizes contents of data bytes by exclusive-ORing them with a prescribed PRBS. The M/H data de-randomizer 100 is connected for supplying the de-randomized bytes of the M/H data and their accompanying extension bits to an IP packet parsing unit 101 for parsing a data stream into IP packets. The IP-packet parsing unit 101 performs this parsing responsive to two-byte row headers respectively transmitted at a beginning of each row of IP data in an RS frame. This row header indicates where the earliest start of an IP packet occurs within a row of IP data bytes within the RS frame. If a short IP packet is completely contained within a row of the RS frame, the IP-packet parsing unit 101 calculates a start of a later IP packet proceeding from the packet length information contained in an earlier IP packet within that same row of the RS frame.

The IP-packet parsing unit 101 is connected for supplying IP packets to a decoder 102 for CRC coding in the IP packets which are UDP/IP datagrams that use User Datagram Protocol (UDP). Each IP packet contains a two-byte, 16-bit checksum for CRC coding of that UDP/IP datagram. The decoder 102 is constructed to preface each IP packet that it reproduces with a prefix bit indicating whether or not error has been detected in that IP packet. The decoder 102 is connected to supply these IP packets as so prefaced to a detector 103 of a "well-known" SMT-MH address and to a delay unit 104. The delay unit 104 delays the IP packets supplied to a selector 105 for sorting SMT-MH packets from other IP packets. The delay unit 104 provides delay equal to the duration of an IP-packet prefix and a part of an IP packet header interval. This delay is long enough for the detector 103 to ascertain whether or not the "well-known" SMT-MH address is detected.

If the detector 103 does not detect the "well-known" SMT-MH address in the IP packet, an output of the detector 103 conditions the selector 105 to reproduce the IP packet for application to a packet sorter 106 as an input signal thereto. The packet sorter 106 sorts out IP packets in which the preface provides no indication of CRC coding error for writing to a cache memory 107 for IP packets. The prefatory prefix bit before each of the IP packets that indicates whether there is CRC code error in its respective bytes is omitted when writing the cache memory 107. The cache memory 107 temporarily stores at least those IP packets not determined to contain CRC code error for possible future reading to later stages 108 of the M/H receiver 2000 of FIG. 7A.

If the detector 103 does detect the "well-known" SMT-MH address in the IP packet, establishing it as an SMT-MH packet, an output of the detector 103 conditions the selector 105 to reproduce an SMT-MH packet for application to an SMT-MH processor 109, which includes capability for generating control signals for the later stages 108 of the M/H receiver 2000. The FIG. 7D portion of the M/H receiver 2000 includes the SMT-MH processor 109 connected for receiving FIC information from the FIC-Chunk processing unit 82 shown in FIG. 7B. The SMT-MH processor 109 integrates this FIC information with information from SMT-MH packets during the generation of service map data. The SMT-MH processor 109 relays those SMT-MH packets that have bit prefixes that do not indicate error in the packets to a user interface 110, which includes an Electronic Service Guide (ESG) and an apparatus for selectively displaying the ESG on a viewing screen (not shown) of the M/H receiver 2000. A user will select the M/H service that he or she desires to get, and the user interface transmits an indication of that selection to the SMT-MH processor 109. The SMT-MH processor 109 responds to this indication per FIC information from the FIC-Chunk processing unit 82 to determine the Ensembles to be decoded by the turbo decoding apparatus for SCCC. SMT-MH processor 109 is connected for commanding the turbo code decoding control unit 69 to control the decoding of the SCCC in selected M/H Groups the selection of which is made according to those determinations of the Ensembles to be decoded made within the SMT-MH processor 109. The service map data generated by the SMT-MH processor 109 is written into a memory 111 for temporary storage therewithin and subsequent application to the cache memory 107 and to the later stages 108 of the M/H receiver 2000.

FIG. 8 is a flowchart illustrating operations of the SMT-MH processor 109, the serial memory for SMT-MH signal and the cache memory 107, all shown in FIG. 7D. This explanation presumes that each of the SMT-MH signals includes a bit indicating whether that signal is a repeat of the previous SMT-MH signal or is an update differing in some regard from the previous SMT-MH signal. Such bit is, however, lacking from the SMT-MH signals specified by A/153, Part 3, as published in September 2009. This explanation further presumes that an SMT-MH signal that differs from the immediately preceding SMT-MH signal will be immediately applied to subsequent IP packets. This mode of operation is at variance with the operation described by A/153, Part 3, as published in September 2009.

After step 120 of entering the SMT-MH processor 109, in step 121 each error-free SMT-MH packet from the selector 105 is relayed to the user interface 107 to be used in the ESG Step 120 of entering the SMT-MH processor 109 is also followed by one of steps 122 and 123 for analyzing a header of the SMT-MH packet to determine whether that SMT-MH packet is transmitted as a repeat of a previous SMT-MH packet or as an updated SMT-MH packet.

In step 122, a header of any erroneous SMT-MH packet supplied to the SMT-MH processor 109 from the selector 105 is analyzed. This analysis is made to determine whether that SMT-MH packet was transmitted as a repeat of a previous SMT-MH packet or as an updated SMT-MH packet, and a result of that determination is temporarily stored. The result of that determination fixes a reference time with regard to how far back processing in accordance with a later repeat SMT-MH packet may be extended without risking processing being done in accordance with an inappropriate SMT. FIG. 8 shows step 122 including temporary storage of the erroneous SMT-MH packet, but this is neither necessary or desirable if no further use is to be made of this packet. Storing the erroneous SMT-MH packet for a time may be useful for the M/H receiver to decide when the alternative procedure for step 125 is the better course to pursue, for example. In one way of implementing the later step 125, processing is performed using an erroneous SM when no error-free SMT is available. When reception conditions are plagued by noise, code-combining a number of successive SMT-MH packets all transmitted as identical repeats may be useful for recovering an error-free SMT-MH packet.

In step 123, the header of any error-free SMT-MH packet supplied to the SMT-MH processor 109 from the selector 105 is analyzed. This analysis is made to determine whether that SMT-MH packet is transmitted as a repeat of a previous SMT-MH packet or as an updated SMT-MH packet. In an exemplary embodiment, the determination that the current SMT-MH packet is a repeat of a previous SMT-MH packet is confirmed by comparing the two packets. The result of the determination is temporarily stored. So is the error-free SMT-MH packet, which will be utilized for directing subsequent operations in the M/H receiver.

In step 124, if a current error-free SMT-MH packet supplied to the SMT-MH processor 109 from the selector 105 is a repeat, that SMT-MH packet is used for processing or continuing to process earlier IP data packets stored in the cache memory 107 that do not precede a previous SMT-MH packet that is an update. If, however, the current error-free SMT-MH packet that is a repeat is a first error-free SMT-MH packet received after a change in sub-channel selection, step 124 of the SMT-MH processing enables processing of at least some, if not all, of the IP packets that are received in a partial RS frame received after the change in sub-channel selection. Step 124 enables processing of previously received IP packets extending back to a previous SMT-MH packet that was an update, but this processing is deferred until subsequent step 125 of the SMT-MH processing is completed.

In step 125, IP data packets extending back before a previous SMT-MH packet that was an update are discarded, and this operation moves on to step 126 of the SMT-MH processing. Discarding these IP packets reduces a chance of receiving mutilated data. By way of example, discarding IP packets can be done by not reading them from the cache memory 107 and overwriting the storage locations temporarily storing those unused IP packets with newly stored IP packets. FIG. 10 shows control signal connections from the memory 111 for storing SMTs to the cache memory for implementing this sort of procedure. Alternatively, the IP packets to be discarded may be read from the cache memory 107 as part of a serial order that all IP packets are read from the cache memory 107, with the discarding of unusable IP packets being done in the later stages 108 of the M/H receiver. FIG. 10 shows control signal connections from the memory 111 for storing SMTs to the later stages 108 of the M/H receiver, and some of the control signals from the memory 111 are contemplated as directing the discarding procedures. In either case, the control signals for implementing the discarding of the IP packets are not direct read-out from the memory 111, but rather are generated by ancillary circuitry responsive to the contents of the memory 111. FIG. 10 does not explicitly show this ancillary circuitry.

Alternatively, in step 125, IP data packets extending back before a previous SMT-MH packet that is an update can be processed in accordance with that previous SMT-MH packet, on the chance that the update in the SMT-MH packet is trivial enough that IP data is not severely mutilated. Then, the operation moves on to step 126 of the SMT-MH processing. In step 126, IP data packets subsequent to a most currently received error-free SMT-MH packet and any repeat thereof are processed in accordance with that most currently received error-free SMT-MH packet until an SMT-MH packet that is an update is received.

If in step 123, the current error-free SMT-MH packet supplied to the SMT-MH processor 109 from the selector 105 is an update, rather than a repeat, the operation moves on to step 127 of the SMT-MH processing before moving on to step 126. In step 127, the otherwise unprocessed IP data packets in the cache memory 107 that were received before the current error-free SMT-MH packet are processed in one of three ways. One way of processing them is to process these IP data packets in accordance with the SMT-MH packet most immediately preceding them if such SMT-MH packet is available. If such SMT-MH packet is not available, these IP data packets are processed in accordance with the current error-free SMT-MH packet that is an update. This is done on a chance that the update in the SMT-MH packet is trivial enough that IP data packets will not be severely mutilated by processing with an improper SMT. This way of processing IP data packets that occur before the first error-free SMT-MH packet received after a change in sub-channel selection still enables the processing of at least some, if not all, of these IP packets when that first error-free SMT-MH packet is an update.

Another way of processing the unprocessed IP data packets in the cache memory 107 that were received before the current error-free SMT-MH packet also processes them in accordance with the SMT-MH packet most immediately preceding them if such SMT-MH packet is available. If such SMT-MH packet is not available, however, these unprocessed IP data packets are discarded, which reduces a risk of IP data packets being mutilated by processing with an improper SMT, presuming reception conditions are reasonably good. This way of processing IP data packets that occur before the first error-free SMT-MH packet received after a change in sub-channel selection still enables the processing of at least some of them that are received in a partial RS Frame when that first error-free SMT-MH packet is an update.

Still another way of processing the unprocessed IP data packets in the cache memory 107 that are received before the current error-free SMT-MH packet is simply to discard them. This avoids a risk of data being incorrectly processed responsive to an inappropriate SMT.

FIG. 9 is an alternative unit that may replace the FIG. 7C portion of the M/H receiver of FIG. 7A. A bypass unit 112 is used to by-pass TRS decoding for a prescribed time interval following sub-channel selection. During that prescribed time interval, data taken directly from the hard-decision unit 92 is reproduced by the bypass unit 112 for application to the M/H data de-randomizer 100 as an input signal thereto. After that prescribed time interval, data read from the RAM 99 is reproduced by the bypass unit 112 for application to the M/H data de-randomizer 100 as an input signal thereto.

FIG. 10 illustrates a detailed schematic diagram of the bypass unit 112, as shown in FIG. 9, for TRS decoding for a time after a sub-channel is newly selected, according to an exemplary embodiment. A detector 113 of keypad selection of a sub-channel generates a SET signal for a set-reset flip-flop 114, which responds to supply a logic ZERO to tri-state gate 115 and to supply a logic ONE to a tri-state gate 116. The respective output ports of the tri-state gate 115 and the tri-state gate 116 are each connected to a common bus 117 for supplying the input port of the M/H data de-randomizer 100. The logic ZERO that the flip-flop 114 supplies to the tri-state gate 115 conditions it to reproduce from a relatively high source impedance the data read to it from the RAM 99. The logic ONE that the flip-flop 114 supplies to the tri-state gate 116 conditions it to reproduce from a relatively low source impedance the data that it receives as an input signal from the hard-decision unit 92. This establishes that data as the input signal supplied via the common bus 117 to the input port of the M/H data de-randomizer 100 until such time as the flip-flop 114 is reset.

The flip-flop 114 is reset at a time when a valid SMT-MH packet would be expected to be read from the RAM 99 to the tri-state gate 115. Resetting is controlled by the decoder 102 for CRC in IP packets and the detector 103 of SMT-MH packets shown in FIG. 7D. FIG. 10 shows that one input of a two-input AND gate 118 receives a logic ONE indication from the decoder 102 when it finds an IP packet to be correct; otherwise a logic ZERO indication is supplied from the decoder 102 to this input of the AND gate 118. FIG. 10 shows that the other input of the AND gate 118 receives a logic ONE indication from the detector 103 when an IP packet is an SMT-MH packet; otherwise a logic ZERO indication is supplied from the detector 103 to this other input of the AND gate 118. An output of the AND gate 118 being a logic ONE indicates that a correct, or valid, SMT-MH packet has been received. The logic ONE output of the AND gate 118 is delayed by a delay unit 119 to compensate for latent delay of the decoding procedures in elements 93-99 of FIG. 7C, and the delayed logic ONE output of the AND gate 118 is applied as RESET signal to the set-reset flip-flop 114.

FIG. 11 is a schematic diagram explaining that the RAM 97 and the RAM 99 both shown in FIG. 7C and in FIG. 9 can be replaced by a single RAM 128, according to an exemplary embodiment. The nine-bit extended bytes from the nine-bit-extended-byte former 96 are written row by row into respective rows of extended-byte storage locations in the RAM 128. The RAM 128 is subsequently read one column of the nine-bit extended bytes at a time to a selected one of the bank 98 of decoders for RS codes to perform the matrix-type block de-interleaving procedure that is a first step of the TRS decoding routine. The extension bits accompanying the eight-bit bytes of the TRS code are used to help locate byte errors for TRS decoding by the selected one of the bank 98 of decoders for RS codes. The eight-bit data bytes that have been corrected insofar as possible by the selected one of the RS decoders in the bank 98 are re-written, column by column, into respective columns of the byte-storage locations of the RAM 128, overwriting previous data-byte content. In a final step of the TRS decoding routine, the byte-storage locations in the RAM 128 are read from row by row to complete a matrix-type block re-interleaving procedure for data supplied to the M/H data randomizer 100. In modifications of the FIG. 7C unit in which the RAM 128 replaces the RAM 97 and the RAM 99, the byte-storage locations in the RAM 128 are read from row by row directly to the M/H data randomizer 100. In modifications of the FIG. 9 unit in which the RAM 128 replaces the RAM 97 and the RAM 99, the byte-storage locations in the RAM 128 are read from row by row to the unit 108 to be relayed to the M/H data de-randomizer 100.

FIG. 12 is an alternative receiver portion that replaces the FIG. 7D portion of the FIG. 7A M/H receiver in currently preferred M/H receiver designs. In the FIG. 12 receiver portion the SMT-MH processor 109 of the FIG. 7D receiver portion is replaced with a more complicated SMT-MH processor 129. This replacement is part of the modifications of the FIG. 7D receiver portion that appear in the FIG. 12 receiver portion, which modifications are made to accommodate use of the SMT-MH signals specified by A/153, Part 3, as published in September 2009. Another of the modifications is that the memory 111 used for temporarily storing SMTs serially in the FIG. 7D receiver portion is replaced in the FIG. 12 receiver portion by a memory 130 that temporarily stores SMTs by section according to addresses formed from ensemble_ID and FIC_version components. Still another modification is that in the FIG. 12 receiver portion the decoder 102 for CRC coding of UDP/IP packets, which decoder 102 affixes a error-information prefix to each UDP/IP packet is immediately followed by a unit 131 extending each such prefix by appending ensemble_ID and FIC_version components. The unit 131 supplies the UDP/IP packets with extended prefixes in its response that provides input signals for the detector 103 of a "well-known" SMT-MH address and to a delay unit 132. The delay unit 132 replaces the delay unit 104 used in the FIG. 7D receiver portion and provides somewhat longer delay to take into account the lengthened prefix of each IP packet. The delay unit 132 delays the IP packets supplied to a selector 105 for sorting SMT-MH packets from other IP packets. The delay unit 132 provides delay of the duration of the IP-packet prefix and a part of an IP packet header interval, which delay is long enough for the detector 103 to ascertain whether or not the "well-known" SMT-MH address is detected.

The ensemble_ID information that the unit 131 uses to extend packet prefixes is supplied from the SMT-MH processor 129 responsive to the ensemble_ID information that it receives from the FIC-Chunk processing unit 82 shown in FIG. 7B. The SMT-MH processor 129 also uses the ensemble_ID information as an initial part of the write addressing for the storage locations in the memory 130 that temporarily store each SMT-MH section. The ensemble_ID information remains the same throughout each RS Frame decoded during the five sub-frames of an M/H Frame.

The FIC_version number that the unit 131 uses to extend packet prefixes is extracted from TPC signals that occur during M/H Groups the SCCC contents of which are turbo decoded to fill each successive RS Frame in the Ensemble(s) containing the M/H service selected by the user. This FIC_version number is also supplied to the SMT-MH processor 129, which uses the FIC_version number to generate a final part of the write addressing for the storage locations in the memory 130 that temporarily store each SMT-MH section. The FIC_version number is used as is in the memory 130 write address if the current_next_indicator bit is set to '1' in the SMT-MH section to be temporarily stored, indicating that SMT-MH section is immediately applicable during continued processing. The FIC_version number is incremented by one in the memory 130 write address if the current_next_indicator bit is set to '0' in the SMT-MH section to be temporarily stored, indicating that application of that SMT-MH section to processing should be deferred until a change in FIC-version occurs in the TPC signal, incrementing its value by one.

FIG. 12 shows a representative way to obtain the stream of FIC_version number that the unit 131 uses to extend prefixes of IP packets. An extractor 132 reproduces FIC_version number from bits 41-45 of each TPC signal decoded by the RS decoder 78 for (18, 10) RS coding shown in FIG. 7B. The extractor 132 supplies the FIC_version numbers in its response as input signal to an FIC-version processing unit 133 that attempts to correct FIC_version numbers found to be incorrect and supplies the results as input signal to a parallel-in/parallel-out shift register 134. The shift clocking for the PIPO shift register 134 is gated to make up for the latent delays in the turbo coding and the subsequent decoding of the two-dimensional forward-error correction coding using TRS and CRC coding.

The FIC_version information may change during the course of an M/H Frame. The FIC_version information typically increments by one in modulo-32 arithmetic with each update in FIC version. A/153 requires that, for each Ensemble, SMT-MH sections describing all the services of that Ensemble shall be included in that Ensemble at least once every RS Frame. However, the FIC_version information may update at different times in different Ensembles and at irregular intervals within an Ensemble. An update of the FIC_version information in the TPC signals, which occurs in one of the M/H Groups that is turbo decoded to write an RS Frame, will be preceded by an SMT-MH section in which the current_next_indicator bit is set to '0'. The SMT-MH processor 129 will direct the temporary storage of that SMT-MH section in storage locations of the memory 130 addressed by the appropriate ensemble_ID and by an FIC_version number one higher than the current one. When the FIC_version number extracted from the TPC signal increments by one so the prefix address of certain IP packets temporarily stored in the cache memory 107 matches with the address of the storage locations of the memory 130 that temporarily store the SMT-MH section in which the current_next_indicator bit is set to '0'. This allows reading of the SMT-MH section from the memory 130 to control the disposition of the IP packets with matching prefix address being read from the cache memory 107.

The underlying concept of operation is that as IP packets are being read from the cache memory, their prefix address applied as read address to the memory 130 will cause the SMT-MH section read therefrom to be that one designed to be applicable to those IP packets being read from the cache memory.

FIG. 13 is a flowchart illustrating one way that the SMT-MH processor 129, the memory 130 for SMT-MH signal and the cache memory 107, all shown in FIG. 12, may be arranged to operate. The SMT-MH processor 129 is arranged for operation using SMT-MH signals specified by A/153, Part 3, as published in September 2009. The SMT-MH signals specified therein lack a specific bit indicating whether that signal is a repeat of the previous SMT-MH signal or is an update differing in some regard from the previous SMT-MH signal. So, it is more complicated to determine whether an SMT-MH signal is a repeat or an update. The SMT-MH signals are specified by A/153 to include a current_next_indicator bit, which when set to '1' shall indicate that the Service Map Table (SMT) sent is currently applicable. When the bit is set to '0', it shall indicate that the SMT is not yet applicable at the time of its transmission and will be the next SMT to become valid. A/153 imposes no requirement that "next" tables must ever be sent. A/153 specifies that an update to the currently applicable SMT shall be signaled by incrementing the version_number field in the SMT-MH signal. So, implementing a method of receiver operation that is the substantial equivalent of that described with the aid of the FIG. 8 flowchart based on the SMT-MH signals specified by A/153, Part 3, as published in September 2009, requires some alterations of the procedural steps shown in the FIG. 8 flowchart. An SMT-MH signal in which the current_next_indicator bit is set to '1' essentially corresponds to a repeated SMT-MH signal of the sort presumed for the method of operation illustrated by the FIG. 8 flowchart. An SMT-MH signal in which the current_next_indicator bit is set to '0' does not corresponds to a repeated SMT-MH signal of the sort presumed for the method of operation illustrated by the FIG. 8 flowchart.

Steps 140-147 in the FIG. 13 flowchart are described immediately following. After step 140 of entering the SMT-MH processor 129, in step 141 each error-free SMT-MH packet from the selector 105 is relayed to the user interface 107 to be used in the ESG Step 140 of entering the SMT-MH processor 129 is also followed by steps 142 and 143 for analyzing a header of the SMT-MH packet to determine whether that SMT-MH packet was transmitted as an SMT-MH packet for current application or as an SMT-MH packet for next application, which next application is apt to be deferred. While FIG. 13 shows the steps 142 and 143 as being performed sequentially in a particular order, alternatively they are performed in opposite order. Another alternative is that just one of the steps 142 and 143 is performed subsequent to a decision step of analyzing the current_next_indicator bit in the SMT-MH packet to determine which one of the steps 142 and 143 is to be performed.

In step 142, the SMT-MH processor 129 analyzes a header of any SMT-MH packet supplied thereto for determining whether that SMT-MH packet was transmitted as an SMT-MH packet for next application. If this is the case, the SMT-MH processor 129 generates a write address for the location in the memory 130 that will be used to store that SMT-MH packet. This write address is composed of the ensemble_ID associated with the RS Frame from which the SMT-MH packet originated and the modulo-32 number one plus the FIC-version number of the TPC for the M/H Group that the SMT-MH packet was received in.

In step 143, the SMT-MH processor 129 analyzes a header of any SMT-MH packet supplied thereto for determining whether that SMT-MH packet was transmitted as an SMT-MH packet for current application. If this is the case, the SMT-MH processor 129 generates a write address for the location in the memory 130 that will be used to store that SMT-MH packet. This write address is composed of the ensemble_ID associated with the RS Frame from which the SMT-MH packet originated and the FIC-version number of the TPC for the M/H Group that the SMT-MH packet was received in.

In step 144, the SMT-MH processor 129 determines from the error information prefix of of any SMT-MH packet supplied thereto for determining whether that SMT-MH packet is to be written to the location in the memory 130 specified by the write address generated in one of the foregoing steps 142 and 143. Only error-free SMT-MH packets are written to the memory 130 for temporary storage therewithin. The prefix and portions of the header are excised from the error-free SMT-MH packet before the SMT-MH processor 129 writes it to the memory 130.

In step 145, IP data packets each with a respective prefix composed of ensemble_ID and FIC_version are read from the cache memory 107 in order of their having been written thereto for temporary storage therewithin. Then, in step 146 each succession of IP packets with same ensemble_ID and FIC_version prefix is processed in accordance with an error-free SMT that is read from storage locations within the memory 130 that are addressed in accordance with that ensemble_ID and FIC_version as in the prefix of each of that succession of IP packets.

Occasionally, the memory 130 may have no error-free SMT-MH packet stored at the location having the address specified by the ensemble_ID and FIC_version in the prefix of each of a succession of IP packets read from the cache memory. This eventuality is addressed in step 147 of the FIG. 13 flowchart. The least risky procedure insofar as ending up with corrupted data is to simply discard the succession of IP packets in question, but this results in considerable loss of M/H data. An alternative procedure is to process the succession of IP packets in question using an error-free SMT-MH packet stored at the location having the address specified by the ensemble_ID and an FIC_version higher by one, presuming that the changes from the earlier FIC version to the later FIC version are usually incremental in nature and may be so slight that using an FIC version other than the specifically prescribed one, is unlikely to cause catastrophic consequences to the processing of the IP packets in question.

FIG. 14 is a flowchart illustrating another way that the SMT-MH processor 129, the memory 130 for SMT-MH signal and the cache memory 107, all shown in FIG. 12, may be arranged to operate. This way of operating permits the processing of successions of IP packets in accordance with erroneous SMT-MH packets should applicable error-free SMT-MH packets be unavailable for some reason. The operations illustrated in the FIG. 14 flowchart presume that the memory 130 is modified to include two banks of addressed storage locations for SMT-MH packets, one bank for storing error-free SMT-MH packets and the other bank for storing erroneous SMT-MH packets. Steps 140, 141, 142, 143, 145 and 146 of the operation illustrated in the FIG. 14 flowchart are the same or essentially the same as the correspondingly numbered steps of the operation illustrated in the FIG. 13 flowchart. The operation illustrated in the FIG. 14 flowchart differs from the operation illustrated in the FIG. 13 flowchart in the following respects.

The step 142 is replaced by a step 148 in which each SMT-MH packet is written to an addressable storage location in the memory 130, as selected by an address that includes the error information as well as the ensemble_ID and FIC_version components of the respective prefix forwarded to the SMT-MH processor 129 with each SMT-MH packet it receives from the selector 105 for sorting SMT-MH packets from other IP packets. The error information from the prefix of each SMT-MH packet is used for selecting which of the two banks of addressed storage locations in the memory 130 that SMT-MH packet will be written to.

An SMT-MH packet that the error information its prefix indicates is an error-free SMT-MH packet is written in the step 148 to an addressed storage location in the bank of the memory 130 reserved for temporarily storing error-free SMT-MH packets. The particular storage location that the error-free SMT-MH packet is written to is specified by the ensemble_ID and FIC_version components of the prefix of that packet. The prefix and portions of the header are excised from the error-free SMT-MH packet before the SMT-MH processor 129 writes it to the memory 130. Except for the additional substep of the selection of a particular bank of storage locations in the memory 130 for the temporary storage of the error-free SMT-MH packet, this part of the step 148 is very much like the step 142 of the operation illustrated in the FIG. 13 flowchart.

The major difference of the step 148 from the step 142 of the operation illustrated in the FIG. 13 flowchart is with regard to the way in which erroneous SMT-MH packets are temporarily stored for use in a later step of operation. An SMT-MH packet that the error information its prefix indicates is an erroneous SMT-MH packet is written in the step 148 to an addressed storage location in the bank of the memory 130 reserved for temporarily storing erroneous SMT-MH packets. The particular storage location that the erroneous SMT-MH packet is written to is specified by the ensemble_ID and FIC_version components of the prefix of that packet. The prefix and portions of the header are excised from the erroneous SMT-MH packet before the SMT-MH processor 129 writes it to the memory 130.

The step 146 is slightly different from the step 146 shown in the FIG. 13 flowchart in that error-free SMT-MH packets are specifically read from the particular bank of the memory 130 reserved for temporary storage of error-free SMT-MH packets.

The step 147 of the operation illustrated in the FIG. 13 flowchart is replaced in the operation illustrated in the FIG. 14 flowchart by a step 149 that resorts on occasion to using erroneous SMT-MH packets read from the memory 130. This is resorted to when there is no error-free SMT-MH packet temporarily stored in the memory 130 at an address specified by the ensemble_ID and FIC_version components of the prefix of each one of a succession of IP packets read or to be read from the cache memory 107. Rather than discarding this succession of IP packets for want of an error-free SMT-MH packet to direct the processing of those IP packets, step 149 provides for the processing of those IP packets as directed by an erroneous SMT-MH packet read from memory 130. The SMT-MH packet is read from an addressable storage location in the bank of the memory 130 reserved for storage of erroneous SMT-MH packets, using a read address corresponding to the ensemble_ID and FIC_version components of the prefix of each one of a succession of IP packets read or to be read from the cache memory 107.

The need for the M/H receiver to resort to an erroneous SMT-MH packet for directing the processing of a succession of IP packets each having common ensemble_ID and FIC_version components in a prefix thereof is likely to arise just after a change has been made in the selection of the RF channel to be received or in the selection of the particular M/H service to be decoded. The receiver risks that the error in the SMT-MH packet will be small enough to that at least partially satisfactory reception of IP packets will result. If it does, the sub-channel is tuned earlier than it would have been if the receiver had waited for an error-free SMT-MH packet to be received to begin processing the IP packets. If reception can be detected as being unsatisfactory, the IP packets can be reprocessed after an appropriate error-free SMT-MH packet is received. In variants of the operation illustrated by the FIG. 14 flowchart, the step 149 is replaced by a step providing all of the alternative procedures available separately in the steps 142 and 149.

In alternative embodiments of those aspects of the invention described with reference to FIGS. 12, 13 and 14 the IP packets stored in cache memory have ensemble_ID and FIC_version information associated with them by means other than attaching prefixes specifying that information. One such alternative is to divide the cache memory 107 into a plurality of banks each associated with a respective bank address composed of the ensemble_ID and FIC_version information. Variants of the FIG. 12 receiver portion will reverse the order of ensemble_ID and FIC_version information in the prefixes of the IP packets and in the addressing of the storage locations in the memory 130.

In other variants of the M/H receiver 2000 described above, indications of byte error from the TRS decoding may be forwarded with the IP packets routed to the cache memory 107. These indications can be used to salvage data from certain types of IP packets that CRC decoding indicates contain error. This may be possible with certain types of IP packets encoding audio signals, for example.

Supposing that an SMT packet is sent only once in an RS frame, it is preferable, but not necessary, that it be sent as late in the data portion of the RS frame as possible, to improve a chance of it being received after a change in sub-channel selection. Immediately preceding an update SMT packet with a repeat SMT packet is an M/H broadcasting procedure that speeds an acquisition of a newly selected sub-channel in an M/H receiver constructed in accordance with the exemplary embodiments.

In A/153 as published in September 2009, the parity bytes generated by the TRS coding are transmitted at the conclusion of 187 successive equal lengths of the M/H data stream used for generating them. If the TRS code is of (235, 187) type, as much as a complete sub-Frame extending over ⅕ of the M/H Frame can be missing, and still the RS frame can be reconstructed. If a little more of the M/H Frame is missing from its beginning, only ¾ of the data bytes in the RS frame might possibly be usable, since ⅕ of the RS frame is composed of parity bytes, which are no longer useful. If ⅖ of the M/H Frame is missing from its beginning, only ½ of the data bytes in the RS frame might possibly be usable. If ⅗ of the M/H Frame is missing from its beginning, only ¼ of the data bytes in the RS Frame might possibly be usable. If ⅘ of the M/H Frame is missing from its beginning, none of the data bytes in the RS frame will be received.

The present inventive concept could benefit substantially if A/153 are rewritten to make the TRS coding non-systematic, with the parity bytes being transmitted at the outset of each RS frame rather than at its conclusion. If the TRS code are of (235, 187) type, as much as a complete sub-Frame extending over ⅕ of the M/H Frame could still be missing without loss of data, although there would be no correction available from TRS decoding. If ⅖ of the M/H Frame are missing from its beginning, ¾ (rather than just ½) of the data bytes in the RS frame might possibly be usable. If ⅗ of the M/H Frame are missing from its beginning, ½ (rather than just ¼) of the data bytes in the RS frame might possibly be usable. If ⅘ of the M/H Frame are missing from its beginning, ¼ of the data bytes in the RS frame might possibly be usable, rather than none of them being received. In general, SMT-MH data could be available for viewing on an M/H receiver screen 0.2 seconds earlier after a change in sub-channel selection.

When IP packets of compressed video are transmitted, I-frames of the compressed video are transmitted every second or so asynchronously with RS frames. After a change in sub-channel selection, the processing of the compressed video cannot proceed until an I-frame is received. If the TRS parity bytes are transmitted at the outset of each RS frame, an I-frame that occurs near the beginning of the data portion of the partial RS frame recovered just after a change in sub-channel selection is less likely to be lost. Recovery of that I-frame can speed up video being provided by as much as the second or so duration of a group of pictures (GoP).

It will be apparent to those skilled in the art and acquainted with this disclosure that various modifications and variations can be made to the exemplary embodiments described above without departing from the spirit or scope of the inventive concept. Thus, it is intended that this inventive concept comprises any such modifications and variations that come within the scope of the appended claims and their equivalents.

What is claimed is:

1. A method by which television transmitters of 8-vestigial sideband (8-VSB) digital modulation of a single radio-frequency carrier wave broadcast mobile/handheld (M/H) data for reception by mobile radio receivers, the method comprising:

coding the M/H data to generate concatenated convolutional coded (CCC) data;

time-division multiplexing the CCC data within the 8-VSB digital modulation such that the CCC data are transmitted in a plurality of M/H Groups disposed in respective slots within sub-Frames of successive M/H Frames, each one of the successive M/H Frames having a duration equal to that of twenty frames of 8-VSB symbols and being divided into five successive sub-Frames respectively, each of the sub-Frames being of a duration the same as the others of them; and having each current sub-Frame of one of the successive M/H Frames incorporate a respective one of a plurality of Transmission Parameter Channel (TPC) signals in each one of the plurality of M/H Groups therein;

wherein the respective one of the TPC signals includes a respective plural-bit indication of a current total number of M/H Groups included within the current sub-Frame of one of the successive M/H Frames.

2. The method set forth in claim 1, wherein each of the TPC signals that is included within one of the plurality of M/H Groups transmitted in one of final three sub-Frames of one of the successive M/H Frames includes a respective indication of a next total number of M/H Groups included within a sub-Frame of a next one of the successive M/H Frames.

3. The method set forth in claim 2, wherein disposition of the indication of the current total number of M/H Groups within each of the TPC signals in one of initial two sub-Frames of one of the successive M/H Frames is similar to disposition of an indication of the next total number of M/H Groups within each of the TPC signals in one of the final three sub-Frames of one of the successive M/H Frames.

4. The method set forth in claim 3, wherein the disposition of the indication of the current total number of M/H Groups within each of the TPC signals in one of initial two sub-Frames of one of the successive M/H Frames is different from disposition of an indication of the current total number of M/H Groups in one of the final three sub-Frames of one of the successive M/H Frames.

5. The method set forth in claim 1, wherein the coding the M/H data to generate the concatenated convolutional coded (CCC) data comprises:

two-dimensionally forward-error-correction (FEC) coding the M/H data to generate two-dimensionally FEC-coded M/H data;

convolutionally coding the two-dimensionally FEC-coded M/H data to generate outer convolutional coding;

interleaving two-bit symbols of the outer convolutional coding to generate symbol-interleaved outer convolutional coding; and 2/3 trellis coding the symbol-interleaved outer convolutional coding to generate CCC data corresponding to serial concatenated convolutional coding (SCCC).

6. Transmitter apparatus for transmitting mobile/handheld (M/H) service data for being reproduced at M/H receivers in addition to main service data for being reproduced at digital television receivers, the transmitter apparatus comprising:

an M/H pre-processor for pre-processing the M/H service data by randomizing, Reed-Solomon (R-S) coding, cyclic redundancy check (CRC) coding, convolutional coding, symbol interleaving, byte de-interleaving and packetizing the M/H service data to generate packets of pre-processed M/H service data;

a packet multiplexer for generating a time-division-multiplex (TDM) signal that multiplexes packets of main service data and the packets of pre-processed M/H service data, the packet multiplexer arranging the packets of pre-processed M/H service data within M/H Groups, each of which M/H Groups is transmitted within a respective one of 16 Slots within one of 5 sub-frames of one of a succession of M/H Frames each of a duration equal to that of 20 8-VSB data frames; and an M/H post-processor for processing the TDM signal to generate eight-level symbols for 8VSB transmission, wherein the M/H pre-processor comprises a signaling encoder for encoding Transmission Parameter Channel (TPC) data and Fast Information Channel (FIC) data by successively R-S coding, randomizing and parallel concatenated convolutional coding (PCCC) the TPC data and FIC data, a respective encoded TPC data signal and a respective encoded segment of an FIC data Chunk being supplied from the signaling encoder for transmission within each of said M/H Groups, each of TPC signals supplied in one of initial two sub-frames of each one of said succession of M/H Frames including at a first position of that TPC signal an indication of a current total number of M/H Groups transmitted in a current sub-Frame of each one of said succession of M/H Frames, each of the TPC signals supplied in one of final three sub-frames of each one of said succession of M/H Frames including at a second position of that TPC signal the indication of the current total number of M/H groups transmitted in the current sub-Frame of each one of said succession of M/H Frames.

7. The transmitter apparatus of claim 6, wherein each of the TPC signals supplied in one of the final three sub-frames of each one of said succession of M/H Frames includes at a first position of that TPC signal an indication of a next total number of M/H Groups transmitted in a sub-Frame of a next one of the succession of M/H Frames.

8. A receiver for 8-vestigial sideband (8-VSB) signals transmitted in modulation of respective radio-frequency (RF) carrier waves within respective allocated frequency channels, some of the respective RF carrier waves modulated by successive M/H Groups of eight-level digital symbols occupying at least some of 16 Slots available in each of five sub-Frames in each of successive M/H Frames, digital symbols in each of the M/H Groups at selected times encoding randomized bits of a respective Reed-Solomon (RS)-coded Transmission Parameter Channel (TPC) signal followed by a respective segment of a block-interleaved RS-coded Fast Information Channel (FIC) signal, the respective RS-coded TPC signal in each of the M/H Groups descriptive of concatenated convolutional coded (CCC) data contained in digital symbols of the M/H Group other than those encoding the respective RS-coded TPC signal followed by the respective segment of the block-interleaved RS-coded FIC signal, the CCC data generated by outer convolutional coding followed by symbol interleaving and 12-phase two-thirds-rate trellis coding, in each of the M/H Groups the respective RS-coded TPC signal including a sequence of bits specifying a current total number of M/H Groups, transmitted in a current sub-Frame of each of the successive M/H Frames, at a prescribed location in each of the five sub-Frames of each of the successive M/H Frames that includes the M/H Groups, each the sequence of bits specifying the current total number of M/H Groups within the current sub-Frame, the segments of RS-coded FIC signal encoded within the one of the M/H Groups within each the sub-Frame being matrix block interleaved for all of the sub-Frame, the receiver for 8-VSB signals comprising:

conversion apparatus for receiving a selected one of the 8-VSB signals as transmitted in 8-VSB modulation of a radio-frequency (RF) carrier wave within a respective frequency channel and converting it to digital samples of a baseband signal;

a cascade connection of decoders connected for receiving digital samples of the baseband signal and for reproducing the respective RS-coded TPC signal followed by the respective segment of block-interleaved RS-coded FIC signal encoded after bit-randomization within each of the M/H Groups;

a bit de-randomizer connected for supplying a de-randomized response to the bits of the respective Reed-Solomon-coded TPC signals followed by respective segments of the block-interleaved RS-coded FIC signal reproduced by the cascade connection of decoders;

a TPC code gate connected for selecting the RS-coded TPC signals from the de-randomized response of the bit de-randomizer;

a first RS decoder connected for decoding the RS-coded TPC signals selected by the TPC code gate and supplying decoded TPC signals;

a TNoG extractor connected for extracting information regarding the current total number of M/H Groups from each and every one of the decoded TPC signals;

a block de-interleaver for the segments of the block-interleaved RS-coded FIC signal, which block de-interleaver includes a memory for temporarily storing the segments of the block-interleaved RS-coded FIC signal, and further, includes a read/write control unit connected for controlling writing and reading of the memory in accordance with the information regarding the current total number of M/H Groups supplied thereto by the TNoG extractor;

an FIC code gate connected for selecting the segments of the block-interleaved RS-coded FIC signal from the de-randomized response of the bit de-randomizer and supplying them to the block de-interleaver as an input signal thereto, for being written into the memory and temporarily stored in the memory; and a second RS decoder connected for decoding the RS-coded FIC signals as read in de-interleaved form from the memory and supplying decoded chunks of an FIC signal.

9. The claim 8 receiver further comprising:

an extractor of an M/H sub-Frame number connected for responding to ones of the decoded TPC signals and for supplying the M/H sub-Frame number for each of the five sub-Frames in each of the successive M/H Frames; and an FIC-Chunk processing unit connected for receiving as a first input signal thereof the decoded chunks of the FIC signal supplied as the output signal of the second RS decoder, the FIC-Chunk processing unit connected for receiving as a second input signal thereof the M/H sub-Frame number currently supplied from the extractor of M/H sub-Frame number, and the FIC-Chunk processing unit connected for supplying a processed FIC signal resulting from parsing and code-combining the decoded chunks of the FIC signal therein.

10. A receiver for 8-vestigial sideband (8-VSB) signals transmitted in modulation of respective radio-frequency (RF) carrier waves within respective allocated frequency channels, some of the respective RF carrier waves modulated by successive M/H Groups of eight-level digital symbols occupying at least some of 16 Slots available in each of five sub-Frames in each of successive M/H Frames, digital symbols in each of the M/H Groups at selected times encoding randomized bits of a respective Reed-Solomon (RS)-coded Transmission Parameter Channel (TPC) signal followed by a respective segment of a block-interleaved RS-coded Fast Information Channel (FIC) signal, the respective RS-coded TPC signal in each of the M/H Groups descriptive of concatenated convolutional coded (CCC) data contained in digital symbols of the M/H Group other than those encoding the respective RS-coded TPC signal followed by the respective segment of the block-interleaved RS-coded FIC signal, the CCC data generated by outer convolutional coding followed by symbol interleaving and 12-phase two-thirds-rate trellis coding, in each of the M/H Groups the respective RS-coded TPC signal including a respective sequence of bits specifying a current total number of M/H Groups, transmitted in a current sub-Frame of each of the successive M/H Frames, at a prescribed location in each of the five sub-Frames of each of the successive M/H Frames that includes the M/H Groups, each the sequence of bits specifying the current total number of M/H Groups within the current sub-Frame, the segments of RS-coded FIC signal encoded within one of the M/H Groups within each the sub-Frame being matrix block interleaved for all of the sub-Frame, the receiver for 8-VSB signals comprising:

- conversion apparatus for receiving a selected one of the 8-VSB signals as transmitted in 8-VSB modulation of a radio-frequency (RF) carrier wave within a respective frequency channel and converting it to digital samples of a baseband signal;
- a cascade connection of decoders connected for receiving digital samples of the baseband signal and for reproducing the respective RS-coded TPC signal followed by the respective segment of block-interleaved RS-coded FIC signal encoded after bit-randomization within each of the M/H Groups;
- a bit de-randomizer connected for supplying a de-randomized response to the bits of the respective Reed-Solomon-coded TPC signals followed by respective segments of the block-interleaved RS-coded FIC signal reproduced by the cascade connection of decoders;
- a TPC code gate connected for selecting the RS-coded TPC signals from the de-randomized response of the bit de-randomizer;
- a first RS decoder connected for decoding the RS-coded TPC signals selected by the TPC code gate and supplying decoded TPC signals;
- an extractor of an M/H sub-Frame number connected for responding to ones of the decoded TPC signals and for supplying the M/H sub-Frame number for each of the five sub-Frames in each of the successive M/H Frames;
- a block de-interleaver for the segments of the block-interleaved RS-coded FIC signal;
- an FIC code gate connected for selecting the segments of the block-interleaved RS-coded FIC signal from the de-randomized response of the bit de-randomizer and supplying them to the block de-interleaver as an input signal thereto, for being written into a memory of the block de-interleaver and temporarily stored in the memory;
- a second RS decoder connected for decoding the RS-coded FIC signals as read in de-interleaved form from the memory and supplying decoded chunks of an FIC signal; and
- an FIC-Chunk processing unit connected for receiving as a first input signal thereof the decoded chunks of the FIC signal supplied as the output signal of the second RS decoder, the FIC-Chunk processing unit connected for receiving as a second input signal thereof the M/H sub-Frame number currently supplied from the extractor of M/H sub-Frame number, and the FIC-Chunk processing unit connected for supplying a processed FIC signal resulting from parsing and code-combining the decoded chunks of the FIC signal therewithin.

* * * * *